US012059820B2

(12) United States Patent
Schlüsselbauer

(10) Patent No.: US 12,059,820 B2
(45) Date of Patent: Aug. 13, 2024

(54) SYSTEM AND METHOD FOR PRODUCING CONCRETE PRODUCTS BY A CASTING METHOD

(71) Applicant: Ulrich Schlüsselbauer, Altenhof (AT)

(72) Inventor: Ulrich Schlüsselbauer, Altenhof (AT)

( * ) Notice: Subject to any disclaimer, the term of this patent is extended or adjusted under 35 U.S.C. 154(b) by 530 days.

(21) Appl. No.: 15/999,342

(22) PCT Filed: Feb. 15, 2017

(86) PCT No.: PCT/EP2017/053358
§ 371 (c)(1),
(2) Date: Aug. 17, 2018

(87) PCT Pub. No.: WO2017/140708
PCT Pub. Date: Aug. 24, 2017

(65) Prior Publication Data
US 2019/0039261 A1 Feb. 7, 2019

(30) Foreign Application Priority Data
Feb. 17, 2016 (DE) ..................... 10 2016 202 411.6

(51) Int. Cl.
*B28B 21/04* (2006.01)
*B28B 5/00* (2006.01)
(Continued)

(52) U.S. Cl.
CPC .............. *B28B 21/04* (2013.01); *B28B 15/00* (2013.01); *B28B 17/0081* (2013.01);
(Continued)

(58) Field of Classification Search
CPC ...................................................... B28B 21/04
See application file for complete search history.

(56) References Cited

U.S. PATENT DOCUMENTS 1,411,757 A * 4/1922 Sumpter .................. B28B 5/04 249/168
2,334,509 A 11/1943 Reeves
(Continued)

FOREIGN PATENT DOCUMENTS

AT 506747 A1 * 11/2009 ........... B28B 15/005
AT 506747 A1 11/2009
(Continued)

OTHER PUBLICATIONS

"Queueing Theory." Queueing Theory—Wikipedia, the Free Encyclopedia, Jan. 28, 2016, web.archive.org/web/20160128234556/en.wikipedia.org/wiki/Queueing_theory. (Year: 2016).*
(Continued)

*Primary Examiner* — Seyed Masoud Malekzadeh
*Assistant Examiner* — Andrés E. Behrens, Jr.
(74) *Attorney, Agent, or Firm* — Procopio, Cory, Hargreaves & Savitch LLP

(57) ABSTRACT

The present invention relates to a method and system for producing concrete products by casting method by means of casting moulds assembled from corresponding outer and inner moulds, having a program-controlled, automated circulation system having a hardening area 420, a program-controlled, automated manufacturing area 100 and a conveying unit 200. The system also has a manually operable mould assembly unit having mould assembly stations M1 to M4 for manually assisted assembly of a casting mould from corresponding outer and inner moulds, wherein the conveying unit comprises a supply conveying section 222 set up to supply a casting mould assembled in the manually operable mould assembly unit to the automated circulation system under program control.

26 Claims, 13 Drawing Sheets

(51) Int. Cl.

| | |
|---|---|
| ***B28B 5/04*** | (2006.01) |
| ***B28B 13/00*** | (2006.01) |
| ***B28B 15/00*** | (2006.01) |
| ***B28B 17/00*** | (2006.01) |
| ***B28B 21/00*** | (2006.01) |
| *B28B 13/02* | (2006.01) |

(52) U.S. Cl.
CPC .............. *B28B 17/009* (2013.01); *B28B 5/04* (2013.01); *B28B 13/027* (2013.01)

(56) References Cited

U.S. PATENT DOCUMENTS

| | | | | | |
|---|---|---|---|---|---|
| 3,078,539 | A | 2/1963 | Duplessis | | |
| 3,334,390 | A | 8/1967 | Steiro | | |
| 3,461,516 | A | 8/1969 | Boucher | | |
| 3,874,832 | A * | 4/1975 | Ohta | B28B 15/00 | 425/88 |
| 3,982,874 | A * | 9/1976 | Nobbe | A01K 1/0151 | 425/424 |
| 4,197,623 | A * | 4/1980 | Suzuki | B28B 15/002 | 114/382 |
| 4,279,583 | A * | 7/1981 | Martin, Sr. | B28B 15/00 | 425/253 |
| 4,492,297 | A * | 1/1985 | Sticht | B23Q 7/1468 | 198/345.3 |
| 4,995,331 | A * | 2/1991 | Voit | B28B 11/044 | 118/46 |
| 6,284,172 | B1 | 9/2001 | Hume | | |
| 8,475,596 | B2 | 7/2013 | Pei | | |
| 9,383,747 | B2 * | 7/2016 | Nussbaumer | G05B 19/409 | |
| 2002/0001514 | A1 * | 1/2002 | Schlusselbauer | B28B 13/04 | 414/325 |
| 2005/0269747 | A1 | 12/2005 | Wuelfing | | |
| 2006/0138688 | A1 | 6/2006 | Hume | | |
| 2008/0156963 | A1 * | 7/2008 | Davies | B28B 7/0097 | 249/70 |
| 2013/0330435 | A1 * | 12/2013 | Lim | B28B 23/0068 | 425/135 |
| 2015/0183129 | A1 * | 7/2015 | Tuomola | B28B 5/04 | 425/454 |
| 2015/0246460 | A1 * | 9/2015 | Schlusselbauer | B28B 21/04 | 264/334 |
| 2015/0314480 | A1 * | 11/2015 | Eilola | B28B 5/04 | 425/169 |

FOREIGN PATENT DOCUMENTS

| | | | | |
|---|---|---|---|---|
| AT | 510888 | A1 | 7/2012 | |
| DE | 3323340 | A1 | 1/1985 | |
| DE | 102012217324.2 | A1 | 3/2014 | |
| DE | 102012217324 | A1 | 3/2014 | |
| EP | 0442587 | A1 | 8/1991 | |
| EP | 2942170 | A1 | 11/2015 | |
| GB | 2137924 | A | 10/1984 | |
| WO | 2014/048684 | A1 | 4/2014 | |
| WO | WO-2020232745 | A1 * | 11/2020 | B28B 15/00 |

OTHER PUBLICATIONS

"SCADA." SCADA—Wikipedia, the Free Encyclopedia, Feb. 10, 2016, web.archive.org/web/20160210200613/en.wikipedia.org/wiki/SCADA. (Year: 2016).*

AT-506747-A1 (Nussbaumer) Nov. 2009 (online machine translation), [Retrieved on Oct. 14, 2022]. Retrieved from: Espacenet (Year: 2009).*

WO-2020232745-A1 (XIE ) Nov. 2020 (online machine translation), [Retrieved on Oct. 26, 2023]. Retrieved from: Google Patents (Year: 2020).*

International Search Report for related International Application No. PCT/EP2017/053358 dated May 3, 2017; English translation provided; 4 pages.

German Patent Office, Search Report, Application No. DE 10 2016 202 411.6, dated Feb. 8, 2017, in 8 pages.

* cited by examiner

SYSTEM AND METHOD FOR PRODUCING CONCRETE PRODUCTS BY A CASTING METHOD

CROSS-REFERENCE TO RELATED APPLICATIONS

This application is a U.S. National Stage entry of PCT Application No: PCT/EP2017/053358 filed Feb. 15, 2017, which claims priority to German Patent Application No. 10 2016 202 411.6, filed Feb. 17, 2016, the contents of which are incorporated herein by reference in their entirety for all purposes.

The present invention relates to a system and method for producing concrete products, especially tubular concrete products or concrete tubes, by a casting method by means of casting moulds having an outer mould or by means of casting moulds having outer and inner moulds.

BACKGROUND OF THE INVENTION

The prior art discloses semiautomated plants and systems for producing concrete products, especially concrete tubes. In this case, the semiautomated production of tubular concrete products, for example, is typically effected by an agitated compression method by means of vibration compaction units, or by a rotary compression method in which the compaction and inner shaping of the tubular concrete products is effected by means of a roller head.

However, production systems for producing tubular concrete products by an agitation compression method or by a rotation compression method are costly and require a large setup area since costly and space-demanding vibration compression units or rotary compression units have to be provided and, in addition, a large product store and a large amount of space for additionally required muff and mould stores are required. In addition, complex reassembly operations are required when products of different size dimensions are to be produced.

It is additionally known that individual tubular concrete products can be manufactured in high quality by a casting method in a fixed stationary mould. However, the relatively long hardening times required for the concrete make it significantly more difficult to provide an automated production system in which tubular concrete products can be manufactured in an automated manner by an inexpensive and high-quality casting method.

In this connection, the prior art includes proposals of automated systems for producing tubular concrete products, especially concrete tubes, in which concrete products, in an automated production cycle, are conveyed by means of a mould conveying unit between individual, fully automated manufacturing stations of a manufacturing area in a circulation system under program control and in a synchronized manner and are produced by a casting method.

A system of this kind is described, for example, in DE 10 2012 217 324 A1. The system of DE 10 2012 217 324 A1 comprises a manufacturing area having a multitude of fully automated manufacturing stations and a mould conveying unit for conveying the casting moulds or the outer mould and the mould core (inner mould) of casting moulds between the manufacturing stations. The manufacturing area has a demoulding station for removing an outer mould from a casting mould positioned at the demoulding station and for removing a hardened tubular concrete product from a mould core positioned at the demoulding station.

In addition, the manufacturing area has a cleaning station for cleaning a mould core positioned at the cleaning station and for cleaning an outer mould positioned at the at least one cleaning station, a mould assembly station for assembling a casting mould from an outer mould and a mould core, and a filling station for filling an assembled casting mould with concrete.

Proceeding from the above-described system of DE 10 2012 217 324 A1, a problem addressed by the present invention is that of providing a system and a method or further developing the method and system of DE 10 2012 217 324 A1, and of extending the variability of usability of the production system and simultaneously improving the usability, reliability and efficiency of the automated circulation cycle or the overall system.

SUMMARY OF THE INVENTION

With regard to the aforementioned problem addressed by the present invention, what are proposed in accordance with the present invention are a system for producing concrete products, especially tubular concrete products or concrete tubes, by a casting method by means of preferably stationary casting moulds according to Claim 1, and a method of producing concrete products, especially tubular concrete products or concrete tubes, by a casting method according to Claim 26. Dependent claims relate to preferred working examples of the present invention.

In one aspect of the present invention, a system for producing concrete products by a casting method by means of casting moulds assembled from corresponding outer and inner moulds, having a program-controlled, automated circulation system is proposed.

The circulation system preferably comprises: a hardening area for storage of concrete products hardening in a respective casting mould; an automated manufacturing area having a multitude of automated manufacturing devices; and/or a conveying unit having automated circulation conveyor sections for conveying the casting moulds or the outer and inner moulds of the casting moulds from the hardening area to the automated manufacturing area, between the respective manufacturing units in the automated manufacturing area and from the automated manufacturing area into the hardening area.

The automated manufacturing area of the circulation system preferably has: an automated demoulding area for demoulding of a casting mould arriving from the hardening area and for removal of a hardened concrete product, an automated cleaning unit for cleaning of the outer and inner moulds of a casting mould demoulded in the demoulding unit, an automated mould assembly unit for assembly of a casting mould from corresponding outer and inner moulds that have been cleaned in the cleaning unit, and/or an automated filling unit for filling of one or more assembled casting moulds with concrete.

The system preferably further comprises a manually operable mould assembly unit having at least one mould assembly station for manually assisted assembly of a casting mould from corresponding outer and inner moulds.

The conveying unit preferably comprises an automated supply conveying section set up to supply a casting mould assembled in the manually operable mould assembly unit (for example upstream of the filling unit of the manufacturing area of the circulation system and especially preferably in program-controlled form) to the automated circulation system.

Preferably, the supply conveying section is set up to supply a casting mould assembled in the manually operable mould assembly unit to the automated circulation system upstream of the filling unit of the manufacturing area of the circulation system. Alternatively, the supply conveying section can be set up to supply a casting mould assembled in the manually operable mould assembly unit to a further filling unit and/or to supply it from the further filling unit to the hardening area of the automated circulation system.

Preferably, a further conveying section is set up to supply a casting mould from the hardening area of the automated circulation system to the manual assembly area.

Preferably, the system comprises an automated transfer unit set up to transfer both casting moulds supplied by means of the supply conveying section from the manually operable mould assembly unit and casting moulds supplied by means of a circulation conveying section from the automated mould assembly unit to one or more filling stations in the automated filling unit.

Preferably, the transfer unit has a program-controlled deflector system for controllable combination of the supply conveying section arriving from the manually operable mould assembly unit and the circulation conveying section arriving from the automated mould assembly unit upstream of the automated filling unit.

Preferably, the transfer unit has a program-controlled robot crane set up to accommodate a supplied casting mould from the supply conveying section arriving from the manually operable mould assembly unit and also to accommodate a supplied casting mould from the circulation conveying section arriving from the automated mould assembly unit, and/or to transfer an accommodated casting mould to the automated filling unit or to one or more of the circulation conveying sections that supply the automated filling unit.

Preferably, the transfer unit has a program-controlled, movable slide table set up to accommodate a supplied casting mould from the supply conveying section arriving from the manually operable mould assembly unit and also a supplied casting mould from the circulation conveying section arriving from the automated mould assembly unit, and/or to transfer an accommodated casting mould to the automated filling unit or to one or more of the circulation conveying sections that supplies the automated filling unit.

Preferably, the transfer unit is further set up to remove a casting mould filled in the automated filling unit and preferably to supply it to a release unit for releasing the filled casting mould into the hardening area.

Preferably, the release unit has an intermediate storage area for intermediate storage of filled casting moulds before release into the hardening area.

Preferably, the release unit has a program-controlled manipulator set up to transfer one casting mould and/or a group of two or more casting moulds into the hardening area and/or to a conveying section of the conveying unit that leads to the hardening area.

Preferably, the release unit has a program-controlled, automated fitting device for fitting a muff on a filled casting mould.

Preferably, the filling unit has a multitude of automated filling stations for parallel filling of multiple casting moulds with concrete in the filling unit.

Preferably, the system has a control unit for programmed control of the manufacturing units of the automated manufacturing area of the circulation system and the conveying unit.

Preferably, the control unit is set up to store an appropriate filling time for each concrete product or for each assembled casting mould, and to control the supply of casting moulds to the multitude of automated filling stations for parallel filling of multiple casting moulds with concrete at the filling unit depending on the corresponding filling times stored for the casting moulds.

Preferably, the control unit is set up to store an appropriate concrete formulation for each concrete product or for each assembled casting mould, and to control the filling of a casting mould at an automated filling station depending on a corresponding concrete formulation stored.

Preferably, a circulation conveying section that supplies from the automated mould assembly unit is set up to accommodate two or more of the multiple casting moulds arriving from the automated mould assembly unit preferably in order to intermediately store accommodated casting moulds prior to supply to the automated filling unit preferably in such a way that the circulation conveying section that supplies from the automated mould assembly unit has a first buffer area.

Preferably, the supply conveying section that supplies from the manually operable mould assembly unit is set up to accommodate two or more of the casting moulds arriving from the manually operable mould assembly unit preferably in order to intermediately store accommodated casting moulds prior to introduction into the circulation system or prior to supply to the automated filling unit, preferably in such a way that the supply conveying section that supplies from the manually operable mould assembly unit has a second buffer area.

Preferably, a control unit of the system or a control unit of the automated transfer unit is set up to control the automated transfer unit and/or, for the control of the automated transfer unit, is set up to decide under program control whether a next free filling station of the filling unit should be occupied by a casting mould arriving from the manually operable mould assembly unit or by a casting mould arriving from the automated mould assembly unit.

Preferably, the decision as to whether a next free filling station of the filling unit should be occupied by a casting mould arriving from the manually operable mould assembly unit or by a casting mould arriving from the automated mould assembly unit is made on the basis of one or more criteria.

The criteria may include, for example, one criterion or two or more criteria from the following enumeration: a criterion of whether a next casting mould arriving from the automated mould assembly unit is the last casting mould of a package series to be filled in succession, a criterion of whether a calculated time until a next-but-one filling station of the filling unit becomes free exceeds a predetermined buffer time, a criterion of whether a calculated introduction frequency of manually assembled casting moulds introduced into the circulation cycle exceeds a limit, a criterion of whether an instantaneous buffer zone occupation of a buffer area of the automated circulation exceeds a limit, and/or a criterion of whether a calculated function of the buffer zone occupation of a buffer area of the automated circulation cycle as a function of time over of a predetermined period of time exceeds a limit.

Preferably, the automated demoulding unit has a grab for removing a muff from a casting mould and/or a grab for removing a hardened concrete product from the casting mould.

In a further aspect, a process may be proposed for producing concrete products by a casting method by means of casting moulds assembled from corresponding outer and inner moulds, having a program-controlled, automated circulation system.

The method may comprise: automated demoulding of a casting mould arriving from the hardening area and removal of a hardened concrete product, automated cleaning of the outer and inner moulds of a casting mould demoulded in the demoulding unit, automated assembly of a casting mould from corresponding outer and inner moulds cleaned in the cleaning unit, and/or automated filling of one or more assembled casting moulds with concrete.

The method may preferably comprise: program-controlled supply of a casting mould assembled in the manually operable mould assembly unit from the filling unit of the manufacturing area of the circulation system to the automated circulation system, by means of an automated supply conveying section.

The method may additionally further comprise one or more of the above-described aspects of the system or steps conducted in the system or comprise one or more of the working examples of the system described hereinafter or steps conducted in the system or one or more steps of the methods described by way of example.

In addition, a computer program product having a computer program stored on a computer-readable data storage medium may be provided, which is executable in a data processing unit or a computer or a computer controller, in such a way that program control of a system according to any of the above aspects or working examples described hereinafter is executed, comprising the executing of the steps of an aforementioned method or one described hereinafter.

In summary, the present invention enables provision of a system and a method in which concrete products can be produced by a casting method in an automated and efficient manner at lower cost and with high quality and reliability both in fully automated and manually assembled form, and especially provision of a system and a method in which concrete products of different dimensions can be manufactured by a casting method in an automated and efficient manner with short cycle times, with extremely short or even without disadvantageous assembly times and, in particular, short holdup times, with firstly automated assembly of the casting moulds and secondly manually assembled casting moulds which can be introduced into the automatic circulation cycle in an optimized and automated manner.

Figure 1A:
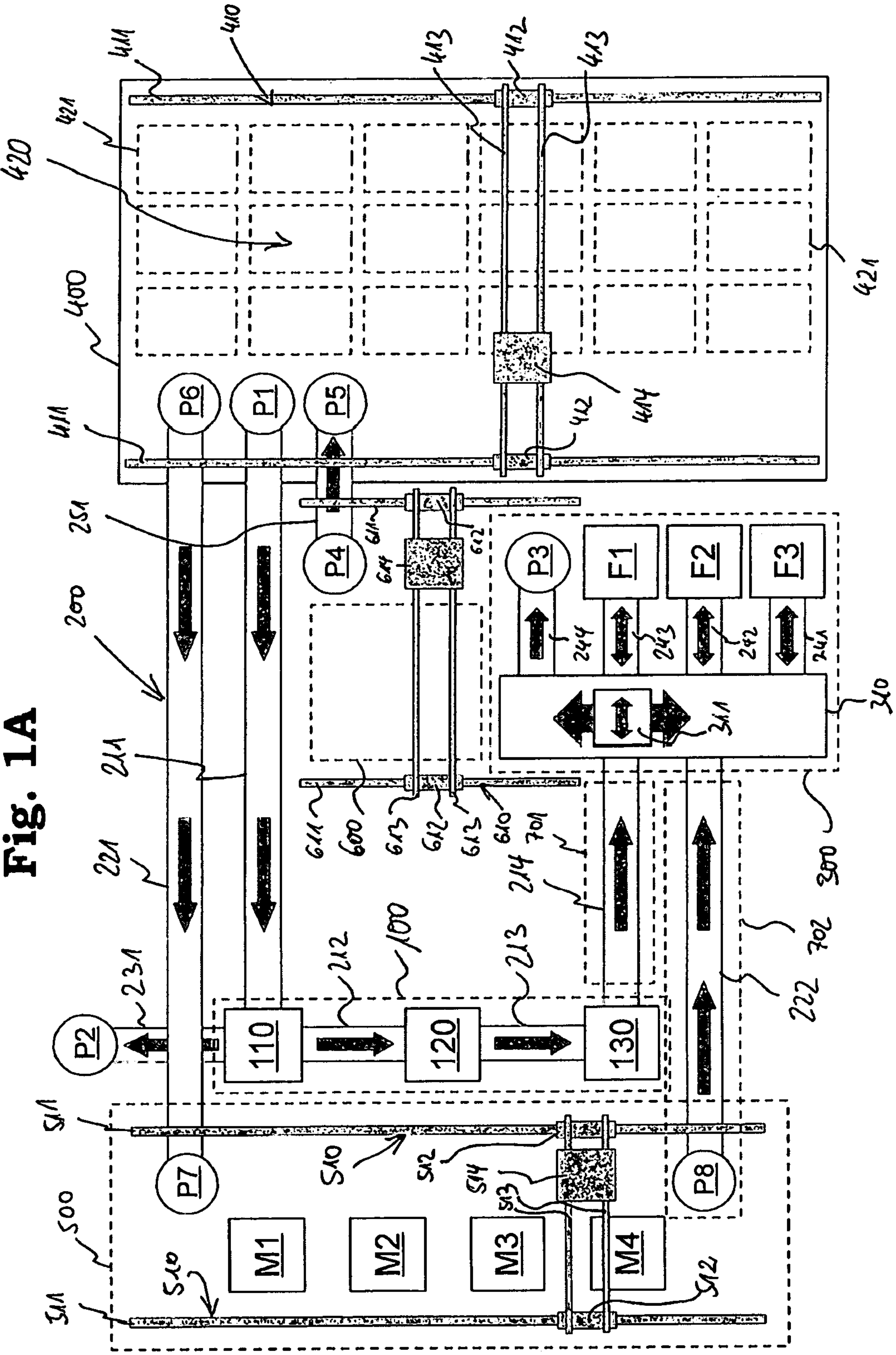
FIG. 1A shows, by way of example, a schematic top view of a system for producing concrete products by casting method in a first working example of the invention.

DETAILED DESCRIPTION OF THE FIGURES AND OF PREFERRED WORKING EXAMPLES OF THE INVENTION

There follows a detailed description of preferred working examples of the present invention with reference to the appended figures. However, the present invention is not restricted to the working examples described. The present invention is defined by the scope of the claims.

Identical or similar features of the working examples are identified by identical reference numerals in the figures. If differences are not explicitly specified or are apparent from the figures, it can be assumed that, the description of the features with identical reference numerals in reference to a working example is likewise applicable to another working example, without repetition of the description in order to keep the description concise.

In addition, the working examples should not be considered to be self-limiting, since it is possible to combine features of the working examples of the present invention described hereinafter or to modify working examples with features of other working examples in order to obtain further working examples of the present invention.

If modifications or combinations of features of this kind are covered by the scope of the claims, they should be regarded as part of the invention, and modifications or combinations of features of this kind should still implicitly be regarded as part of the disclosure of this description.

It is pointed out that terms used hereinafter such as "mould intake position" or "mould release position", for example, are used purely according to viewing angle or perspective, but from a technical point of view, in a closed cycle, may have the same function or be used in an equivalent manner. It would be equally be possible to refer to a "mould release position" in which a casting mould can be positioned for releasing to a further region or to another unit, from the point of view of the receiving region or the receiving unit, for example, as a "mould intake position" as well.

First Working Example

FIG. 1A shows a schematic top view of a system for producing tubular concrete products by way of example by a casting method by way of example by means of upright casting moulds by way of example in a first working example of the invention.

In general, all casting moulds used in the system have an outer mould and optionally an inner mould that can be positioned within the outer mould. By way of example, casting moulds, in the automated circulation cycle, may each have an upright outer mould and a mould core (inner mould) arranged (optionally vertically) within the upright outer mould. Analogously, it is also possible for manually assembled casting moulds to have an outer mould and an inner mould that can optionally be positioned within the outer mould.

Optionally, the casting moulds assembled in an automated manner and/or the manually assembled casting moulds may, for example, also have a lower muff on the underside, which serves, for example, as a base for standing up the casting moulds and/or else for locking the outer mould to the mould core. Lower muffs of this kind may be removably or firmly secured to the mould core.

It is likewise possible for the casting moulds assembled in an automated manner and/or the manually assembled casting moulds to be sealed in working examples from the top with upper muffs, for example, in which case, in further working examples, it is possible to provide respective manufacturing stations that are preferably arranged downstream of the filling stations and where upper muffs can be placed (preferably in a fully automated manner) onto already concrete-filled casting moulds.

In addition, according to the demands on the concrete product, further mouldings and/or reinforcements or reinforcement cages may be provided in the casting moulds on or in casting moulds assembled in an automated manner and/or on or in manually assembled casting moulds. As well as reinforcements or reinforcement cages, it is also possible to secure or mount further structural parts remaining in or on the finished concrete product on the casting moulds, for example in order to introduce climbing aids or stirrups or else transport anchors that remain in the product. In the case of specialty concrete products, these may also be other installed parts, for example valves or frames and/or grids for road gullies.

The system for producing concrete products according to FIG. 1A comprises an automated or fully automated and optionally program-controlled circulation cycle having a manufacturing area having a multitude of automated manufacturing stations 110, 120, 130 of an automated demoulding and assembly area 100 and a multitude of automated manufacturing stations or filling stations F1 to F3 of a mould filling region 300 and a mould conveying unit 200 with mould conveying sections 211, 212, 213, 214, 241, 242, 243, 244 and 251, which run between the manufacturing stations for the respective automated production lines of the circulation cycle.

The manufacturing stations of the system and any further working examples with further configurations of manufacturing stations are described in more detail later on in the description.

The system for producing concrete products by a casting method according to FIG. 1A further comprises a (preferably automated, fully automated or program-controlled) hardening area 420 of a mould store 400 for storing a multitude of filled casting moulds and an automated transport unit 410, wherein the transport unit 410 is set up to transport casting moulds from a mould release position P5 to storage positions in storage areas 421 in the hardening area 420 and from storage positions in storage areas 421 in the hardening area 420 to a mould intake position P1.

The mould intake position P1 serves here by way of example as transfer position of casting moulds from the hardening area 420 to the manufacturing area of the circulation cycle, and the mould intake position P1 serves here as transfer position of casting moulds from the manufacturing area to the hardening area 420.

The storage areas 421 (for example the areas of the dotted rectangles 421 in the hardening area 420) may, in working examples, take the form of simple positioning areas or hall floor areas of a factory hall. In further working examples, storage areas 421 of this kind may also be provided as climate-controlled chambers (maturing chambers) or climate-controlled areas in which stored, filled casting moulds can be stored in climate-controlled environments that have been brought to desired temperatures for faster or better hardening (for example heated in relation to ambient temperature or heated by comparison with room temperature in the manufacturing area). In this case, different storage areas 421 may accommodate one or more casting moulds and may optionally also have mutually different temperatures or temperature profiles against time, for example according to the concrete formulation and/or product type or size.

The climate-controlled chambers/maturing chambers may be units for controlled climatic conditions in relation to temperature and/or air humidity, where this usually comprises heating units, for example more particularly for heating generally at the start of a hardening cycle, especially in order to accelerate the chemical hardening reaction of the concrete by supply of heat. Furthermore, it is also possible to control air humidity (high air humidity advantageously prevents, for example, the formation of cracks during hardening).

Preferably, the multitude of casting moulds stored in the hardening area 420 has a multitude of groups of casting moulds, where casting moulds in a group have an equal mould size and casting moulds of different groups have different mould sizes, and where the casting moulds stored in the hardening area 420 are arranged by groups, and casting moulds of one group may be arranged in a coherent common sub-area of the hardening area 420.

This advantageously enables storage of casting moulds of multiple different dimensions simultaneously in the hardening area 420. In this case, it is thus possible for casting moulds of different dimensions to be present simultaneously in the circulation of the production system, such that the production of tubular concrete products of very different size and possibly even different shape becomes possible in the same circulation cycle without the requirement for assembly times or holdup times, and so a considerable gain in efficiency and time is achievable.

The transport unit 410 comprises, by way of example, a grab unit 414 (manipulator) which is guided by way of example on a first guiding device with guides 413, which is guided by way of example on a second guiding device that runs transverse thereto with guide blocks 412 guided on guides 411. The transport unit 410 is set up, by way of example, to move the grab unit 414 by means of the guide units 411, 412 and 413 within the region of the hardening area 420 and hence to be able to accommodate casting moulds by means of the grab unit 414 over the entire hardening area 420, and to transport accommodated casting moulds within the region of the hardening area 420.

More particularly, the transport unit 410 is set up by way of example to accommodate a casting mould stored in the hardening area 420 in an automated or program-controlled manner and to transport it in an automated or program-controlled manner to the mould intake position P1 or to accommodate a casting mould disposed at the mould release position P5 in an automated or program-controlled manner, and to transport it in an automated or program-controlled manner to the corresponding storage position in a corresponding storage area 421 in the hardening area 420.

The manufacturing area of the system has, by way of example, the following manufacturing stations: a demoulding station 110 is set up by way of example for automated or program-controlled removal of an outer mould from a casting mould positioned at the demoulding station 110 and/or for automated or program-controlled removal of a hardened tubular concrete product from a mould core (inner mould) positioned at the demoulding station 110. A cleaning station 120 is set up by way of example for automated or program-controlled cleaning of a mould core positioned at the cleaning station 120 and/or an outer mould positioned at the cleaning station 120. A mould assembly station 130 is set up by way of example for automated or program-controlled assembly of a casting mould from a cleaned outer mould and a cleaned mould core, and the filling stations F1, F2 and F3 are set up for automated or program-controlled filling of a casting mould of the respective composition with concrete.

In this case, by way of example, an automated demoulding and assembly area 100 is provided, in which introduced moulds with an already cured concrete product can be demoulded by way of example (disassembly of the casting mould and removal of the concrete product), for automated release of the finished concrete product, wherein the mouldings (outer and/or inner mould) of the casting mould, by way of example, after removal and release of the finished concrete product, can be cleaned and assembled to form a newly assembled casting mould, in order to be fed back to the filling region 300 in an automated or program-controlled circulation cycle, where casting moulds can be filled with concrete at a respective filling station F1, F2 or F3 in the casting method, in order then to send them back to the hardening area 420 for hardening.

Consequently, the manufacturing area has, by way of example, a production line of an automated or program-controlled circulation cycle, which comprises, by way of example, the automated or program-controlled operations of demoulding the casting mould (demoulding station 110), of cleaning the casting mould (cleaning station 120), of assembling/mating the cleaned casting mould (mould assembly station 130) and of filling/casting with concrete (filling stations F1 to F3), wherein the hardening area 420 under automated control and the transport unit 410 thereof can provide a closed-loop system for use or re-use of casting moulds in the circulation cycle for production of the concrete products.

By way of example, it is possible to use shrink cores, for example, as mould cores, which are shrunk at the demoulding station 110 in order to be able to remove the concrete product at the demoulding station 110. In addition, any lower muffs may be secured firmly to the mould cores and may also be cleaned in the cleaning station 120. At the mould assembly station 130, the outer moulds may be put over the mould cores and optionally locked to any lower muffs. However, it is also possible to use other kinds of inner moulds.

The manufacturing stations 110 to 130 and F1 to F3 according to the working example in FIG. 1A are set up by way of example to execute the respective operations simultaneously, such that, by way of example, two or more casting moulds may simultaneously be present in the circulation cycle of the manufacturing stations 110 to 130 and F1 to F3, for example one casting mould in the demoulding station 110, one casting mould in the cleaning station 120, one casting mould in the mould assembly station 130 and respective casting moulds in the respective filling stations F1 to F3.

In the case of optional provision of intermediate positions, it would optionally be possible for even more casting moulds to be present simultaneously in the circulation cycle of the manufacturing stations 110 to 130 and F1 to F3. For example, further casting moulds may be present in respective mould conveying sections of the mould conveying unit 20, for example in any of the buffer areas provided before, between or beyond the respective manufacturing stations 110 to 120 (see, for example, buffer area 701 after the mould assembly station 130 in the mould conveying section 214).

The mould conveying unit 200 is set up by way of example to transport casting moulds from the mould intake position P1 in an automated, fully automated or preferably program-controlled manner to the respective manufacturing stations 110 to 130 or F1 to F3 and between the respective manufacturing stations 110 to 130 or F1 to F3, and to convey casting moulds from the filling stations or F1 to F3 to the mould release position P5.

In the working example according to FIG. 1A, the mould conveying unit 200 comprises, by way of example, a mould conveying section 211 for automated conveying of a filled and hardened casting mould from the mould intake position P1 to the demoulding station 110, especially in relation to a casting mould which has been accommodated by the transport unit 410 in the hardening area 420 from a storage position of a storage area 421 and positioned or placed at the mould intake position P1. The mould conveying section 211 can accommodate multiple casting moulds and hence optionally also be used as a buffer area before the demoulding station 110.

In addition, the mould conveying unit 200 comprises, by way of example, a mould conveying section 212 for automated conveying of a casting mould demoulded at the demoulding station 110 from the demoulding station 110 to the cleaning station 120 and a mould conveying section 231 for automated conveying of a hardened concrete product removed at the demoulding station 110 from the casting mould to a product release position P2 at which finished concrete products can be removed from the cycle. The mould conveying section 212 may optionally accommodate one or more casting moulds and hence also be used as buffer area between the demoulding station 110 and the cleaning station 120.

In addition, the mould conveying unit 200 comprises, by way of example, a mould conveying section 213 for automated conveying of a casting mould cleaned at the cleaning station 120 from the cleaning station 120 to the mould assembly station 130 and a mould conveying section 214 for automated conveying of a mould assembled at the mould assembly station 130 from the mould assembly station 130 to a transfer unit 310 for transfer/supply of casting moulds to the filling stations F1 to F3.

The mould conveying section 213 can thus accommodate one or more casting moulds and hence optionally also be used as buffer area between the cleaning station 120 and the mould assembly station 130. The mould conveying section 214 can accommodate multiple casting moulds and hence optionally also be used as buffer area 701 between the mould assembly station 130 and the transfer unit 310.

In the working example according to FIG. 1A, the circulation cycle or the manufacturing area further comprises an automated or program-controlled filling area 300 having, by way of example, three parallel filling stations F1 to F3. The filling area 300 comprises, by way of example, an automated or program-controlled transfer unit 310 set up to accommodate casting moulds conveyed by the mould conveying section 214 from the assembly station 130 and to supply them in an automated, fully automated or preferably program-controlled manner to one of the filling stations F1 to F3 for filling with concrete by a casting method.

In this context, it is preferably a programmed controller of the system (not shown) that decides when a further casting mould for filling with concrete is transferred and to which filling station F1 to F3, preferably in general as soon as a filling station becomes free in the circulation cycle, when a casting mould that has been transferred beforehand is fully filled and has been transported away. However, it is possible to prestore individual pouring times for respective casting moulds, and for the transfer unit 310 to be controlled, in working examples, with the provision of altering a sequence of the casting moulds to be filled on the basis of the prestored pouring times.

In the working example according to FIG. 1A, the transfer unit 310 has, by way of example, a slide table 311 (displacement slide) movable, by way of example, transverse to the conveying direction of the mould conveying section 214 in order to supply a casting mould accommodated by the mould conveying section 214 to one of the mould conveying sections 241, 242 or 243, where the mould conveying sections 241, 242 or 243 are each set up to supply the respective casting mould from the slide table 311 of the respective filling station F1, F2 or F3 for filling of the casting mould at the respective filling station F1, F2 or F3.

After the casting moulds have been filled, the mould conveying sections 241, 242 or 243 are each set up to supply the respective casting mould from the respective filling station F1, F2 or F3 back to the slide table 311 of the transfer unit 310, preferably in such a way that the slide table 311 can convey the casting mould to the mould conveying section 244 by movement thereto, where the mould conveying section 244 is set up to accommodate the already filled casting mould from the slide table 311 and supply it to the mould release position or intermediate position P3. Alternatively (or additionally), it would be possible to set up the mould conveying section 244 to supply the already filled casting mould directly to a release position arranged in the hardening area.

By way of example, in the system according to FIG. 1A, a further mould intake position P4 is provided, from which a further mould conveying section 251 conveys each of the casting moulds to the release position P5 disposed in the hardening area 420, whence the grab unit 414 of the transport device 410 can accommodate the respective casting mould and transport it to the predetermined storage area 421 in the hardening area 420.

To convey the casting moulds between the intermediate position P3 and the mould intake position P4, in FIG. 1A, a further transport unit 610 is provided by way of example in order to be able to place casting moulds, if appropriate, in an intermediate storage area 600 (optional).

The transport unit 610 comprises, by way of example, a grab unit 614 (manipulator) which is guided by way of example on a first guide unit with guides 613, which is guided by way of example on a second guide unit that runs transverse thereto with guide blocks 612 guided on guides 611. The transport unit 610 is set up by way of example to be able to move the grab unit 614 by means of the guide units 611, 612 and 613 in the region of the intermediate storage area 600 and to accommodate casting moulds by means of the grab unit 414, and to be able to transport accommodated casting moulds between the intermediate storage area 600 and the respective positions P3 and P4.

More particularly, the transport unit 610 is set up by way of example to accommodate a casting mould at the intermediate position P3 in an automated or program-controlled manner and transport it in an automated or program-controlled manner to the mould intake position P4 or to the intermediate storage area 600 or to accommodate a casting mould disposed within the intermediate storage area 600 in an automated or program-controlled manner and transport it in an automated or program-controlled manner to the mould intake position P4.

The intermediate storage area 600 can be used, for example, to allow release of air from casting moulds prior to closure with muffs after filling, manual checking of casting moulds and/or else mounting of upper muffs on the casting moulds for closure of the casting moulds. Alternatively, it is also possible to provide an automated or program-controlled muff indentation station for automated application of the upper muffs on the casting moulds for closure of the casting moulds.

According to the working example from FIG. 1A, by way of example, as well as the automated circulation cycle, a manual assembly area 500 is provided, where casting moulds or else individual casting moulds can be manually assembled, where the manual assembly area 500 is integrated or connected to the system in such a way that, for the manufacture of concrete products with manually assembled casting moulds, at least the automated filling area 300 and the automated hardening area 420 of the system are also used.

For this purpose, the hardening area 420 further comprises a mould intake position P6 to which casting moulds can be transported by means of the transport unit 410. The mould conveying unit 200 additionally further comprises, by way of example, a mould conveying section 221 for automated or program-controlled conveying of casting moulds from the mould intake position P6 in the hardening area 420 to the mould intake position P7 of the manual assembly area 500.

The manual assembly area comprises, by way of example, four manual assembly stations M1 to M4, each of which is set up for manual users to be able to manually assemble casting moulds at these manual assembly stations M1 to M4, i.e. especially to be able to manually assemble casting moulds from mouldings, outer moulds, inner moulds, muff parts and/or reinforcement parts. For this purpose, the assembly stations M1 to M4 may have, by way of example, manually controllable manipulators or manually controllable cranes or crane arms in order to assemble heavy components.

In addition, each assembly station M1 to M4 or the manual assembly area 500 may comprise a computer or a control unit connected to the system controller where the user can confirm in each case when a casting mould has been assembled to completion at one of the assembly stations M1 to M4 and can be supplied to the automated filling area 300 and can optionally also serve for input of an individual pouring time/filling time of the manually assembled casting mould and/or for input of an individual concrete formulation for the automated filling of the manually assembled casting mould:

To convey the casting moulds between the mould release position P7 of the manual assembly region 500 and the mould intake position P8 of the manual assembly region

500, a further transport unit 510 is provided by way of example in FIG. 1A in order to transport casting moulds, if necessary, within the manual assembly area 500.

The transport unit 510 comprises, by way of example, a grab unit 514 (manipulator) which is guided by way of example on a first guide unit with guides 513, which is guided by way of example on a second guide unit that runs transverse thereto with guide blocks 512 guided on guides 511. The transport unit 510 is set up by way of example to move the grab unit 514 by means of the guide units 511, 512 and 513 in the region of the manual assembly region 500 or to be able to accommodate casting moulds by means of the grab unit 514, and to be able to transport accommodated casting moulds between the respective positions P7 and P8 and the manual assembly stations M1 to M4.

More particularly, the transport unit 510 is set up by way of example to accommodate a casting mould at the mould release position P7 in an automated or program-controlled manner and to transport it in an automated or program-controlled manner to one of the manual assembly stations M1 to M4 or to accommodate a casting mould disposed at one of the manual assembly stations M1 to M4 in an automated or program-controlled manner and to transport it in an automated or program-controlled manner to the mould intake position P8.

Finally, the system according to FIG. 1A additionally comprises, by way of example, a mould conveying section 222 of the mould conveying unit 200 for conveying a casting mould manually assembled in the manual assembly area 500 from the mould intake position P8 to the transfer unit 310. In this case, the mould conveying section 222 may accommodate, by way of example, multiple casting moulds and hence be used as buffer area 702 in order to intermediately store casting moulds in a buffering manner before they are conveyed by means of the transfer unit 310 to one of the filling stations F1 to F3 in each case and hence supplied to the automated circulation cycle.

The slide table 311 (displacement slide) of the transfer unit 310 is set up by way of example to be moved transverse to the conveying direction of the mould conveying section 222 in order to supply a casting mould accommodated by the mould conveying section 222 to one of the mould conveying sections 241, 242 or 243, where the mould conveying sections 241, 242 or 243 are each set up to supply the respective casting mould from the slide table 311 to the respective filling station F1, F2 or F3 for filling of the casting mould at the respective filling station F1, F2 or F3.

In this case, it is preferably the programmed system controller (not shown) that decides when a further casting mould from which of the mould conveying sections 214 or 222 is supplied and to which filling station F1 to F3 for filling with concrete, preferably in general as soon as a filling station becomes free in the circulation cycle, when a casting mould that has been transferred beforehand is fully filled and has been transported away. More particularly, it is the programmed system controller (not shown) that preferably decides when a manually assembled casting mould arriving from the manual assembly area 500 is accommodated by the mould conveying section 222 and supplied by the transfer unit 310 to one of the filling stations F1 to F3, especially in order to supply a manually assembled casting mould to the circulation cycle in an automated or program-controlled manner.

In this case, it is optionally possible to use a controller in the filling station supply in a production system according to an illustrative process described later on.

For example, the controller, in working examples, can be set up to occupy the N filling positions (in FIG. 1A by way of example with N=3 corresponding to the number of filling stations F1 to F3) in an automated manner. The controller can occupy the filling stations with casting moulds in such a way that the production program that may have been defined layer by layer is optimized. Illustrative boundary conditions may be, for example: the controller may know the individual casting durations per casting mould; the system has N filling stations; and/or each filling station can fill each mould in the system. In the normal case, the moulds from the automatic line of the circulation system can be filled preferentially, for example in order not to cause a backlog in the synchronized region of the automatic line. However, the reverse case is also conceivable, in which moulds from the manual line are processed preferentially.

By way of example, the condition can be imposed on the system computer controller that only when it is possible to calculate by a numerical preliminary calculation or simulation calculation (for example based on the number of buffer positions of the circulation cycle, the pouring times of the casting moulds and/or the cycle time x of the circulation cycle, i.e. an automatically assembled mould is provided by the assembly station 130 every x minutes) that the automated manufacture of the circulation cycle is not being blocked is a decision made to convey a mould from the manual assembly area to one of the filling stations or supply it to the circulation cycle, and hence not block the circulation cycle or to bring it to a halt.

In this context, in the decision as to whether a manually assembled casting mould from the manual assembly area 500 or a casting mould assembled in an automated manner is the next to be supplied to the filling area 300 from the automated circulation cycle, the occupation of the buffer positions in the buffer areas 701 and/or 702 is also taken into account. Specifically, the buffer 701 (conveying unit section 214) from the automated line, but also the buffer 702 from the manual line, can be included in the consideration.

The system or system controller can use a programmed algorithm to make the decision in each case as to whether the next mould is brought to the filling stations from the automated line or from the manual line. For example, on the basis of the moulds present in the filling stations and their residual pouring times and, for example, on the basis of the pouring time/filling duration of the next mould in the manual line, it is possible to calculate whether a backup would arise in the automated line in the buffer area 701 if the mould from the manual line were to be the next mould brought to the casting station.

1st practical example: casting position 1 (filling station F1) is currently occupied with residual pouring time 5 minutes, casting position 2 (filling station F2) is currently occupied with residual pouring time 7 minutes and casting position 3 (filling station F3) became free, meaning that an automated decision can be made as to whether a mould is taken from the automated area from the buffer area 701 or from the mould conveying section 214 or whether a mould is taken from the manual assembly area from the buffer area 702 or from the mould conveying section 222 to be the next to be supplied by means of the transfer unit 310 to the free filling station F3.

The free buffer time in the automated line in the buffer area 701 before a holdup, calculated on the basis of the current buffer occupation in the buffer area 701 and the cycle time, is currently 3 minutes. The pouring time for the next mould from the automated line has been prestored as 6 minutes and the pouring time for the next mould from the manual line has been prestored as 12 minutes. The outcome in this practical example is preferably that the decision is made to fill the free casting position of filling station F3 with a mould from the automated line since a holdup in the circulation cycle would otherwise be brought about.

2nd practical example: casting position 1 (filling station F1) is currently occupied with residual pouring time 5 minutes, casting position 2 (filling station F2) is currently occupied with residual pouring time 3 minutes and casting position 3 (filling station F3) became free, meaning that an automated decision can be made as to whether a mould is taken from the automated area from the buffer area 701 or from the mould conveying section 214 or whether a mould is taken from the manual assembly area from the buffer area 702 or from the mould conveying section 222 to be the next to be supplied by means of the transfer unit 310 to the free filling station F3. The free buffer time in the automated line in the buffer area 701 before a holdup, calculated on the basis of the current buffer occupation in the buffer area 701 and the cycle time, is currently 8 minutes. The pouring time for the next mould from the automated line has been prestored as 6 minutes and the pouring time for the next mould from the manual line has been prestored as 5 minutes. The outcome in this practical example is preferably that the decision is made to fill the free casting position of filling station F3 with a mould from the manual line, since there is no threat of a holdup in the circulation cycle.

In general, it is possible here to use a decision algorithm in which, on the basis of the current buffer occupation in the buffer area 701 and the cycle time, it is possible to calculate a free buffer time in the automated line in the buffer area 701 before a holdup. If a filling station then becomes free, it is possible on the basis of the shortest residual pouring time in the other filling stations and the calculated free buffer time to calculate whether there is a threat of a holdup if the next mould is supplied to the filling area from the manual line. If the calculated free buffer time is, for example, less than or equal to the shortest residual pouring time of the other filling stations, the filling station that has become free should be occupied directly with a casting mould from the automated line. Otherwise, if the calculated free buffer time is, for example, greater than the shortest residual pouring time of the other filling stations, the filling station that has become free can optionally be occupied with a casting mould from the manual line.

In further examples, it would nevertheless be possible here to take the next mould from the automated line if this is part of a package series to be concluded, meaning that, for example, filling of this mould will complete a package of a mould series of a group of moulds in a predetermined number, in which case the moulds of the package series can optionally be taken up together by the grab unit 414 from the mould release position P5 in order to be supplied in a package together to a storage area 421 in the hardening area 420, in order to harden together (for example in the case of identical products of the same size and concrete formulation with the same hardening time), for example when the proposed manipulator of the grab unit 414 for the hardening area 420 advantageously works with packages of moulds (e.g. 3-mould package, 4-mould package or 5-mould package), it would then be possible for the algorithm by way of example to take account of the fact that the whole package in each case (or even a whole series of moulds of the same type) are preferentially cast by the automated line in series (without interruption by a mould from the manual line).

The features of this execution may, in further working examples, be combined individually or as a whole with features of the working examples described above and below.

Second Working Example

Figure 1B:
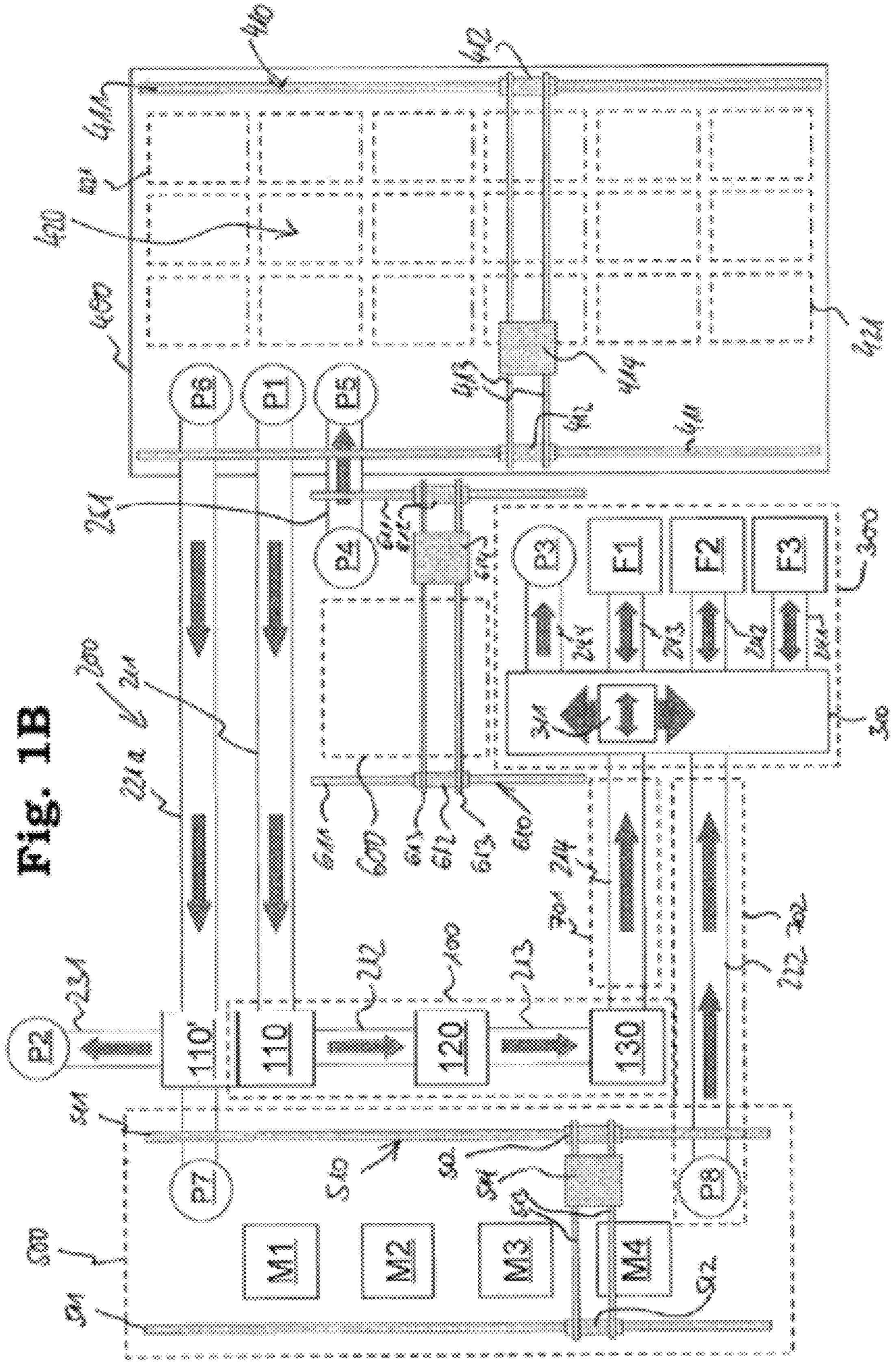
FIG. 1B shows, by way of example, a schematic top view of a system for producing concrete products by casting method in a second working example of the invention.

FIG. 1B shows a schematic top view of a system for producing tubular concrete products by way of example by a casting method by way of example by means of upright casting moulds by way of example in a second working example of the invention.

In contradistinction with the working example according to FIG. 1A, in this case, in the region of the conveying section of the mould conveying unit 200, between the mould intake position P6 in the hardening area 420 and the mould release position P7 in the manual assembly area P7, a further automated or program-controlled demoulding station 110' is provided, which is set up to demould, in an automated manner, casting moulds that have been transported by the mould conveying section 221*a* from the mould intake position P6 (analogously to the demoulding station 110 in FIG. 1A) and to remove finished concrete products and then to convey them via the mould conveying section 231 to the product release position P2.

In this case, it is thus possible, in the working example according to FIG. 1B, in the system, for a casting mould that has been conveyed from the hardening area 420 in the conveying section 221*a* to the manual assembly area 500 to also be demoulded in an automated or program-controlled manner at the demoulding station 110', for example in order firstly to disassemble the mould parts, for example outer and inner moulds, or to release the finished concrete product for release at position P2, analogously to casting moulds in the circulation cycle that are conveyed by means of the conveying section 211 to the demoulding station 110.

This means that, in the system according to FIG. 1B, by way of example, the manual line (i.e. the production line to and from the manual assembly area 500), as well as the automated filling area 300 and the automated hardening area 420, as in FIG. 1A, also includes/also uses an automated demoulding area in the demoulding stations 110 and 110', and hence the demoulding, filling and hardening of the casting moulds in the manual line, i.e. the casting moulds manually assembled in the manual assembly area 500, can advantageously be conducted in an automated or program-controlled manner.

In this case, at the demoulding stations 110 and 110', separate and independently operating demoulding manipulators may be provided. For complete separation of the two lines, it is thus possible by way of example to use two demoulding manipulators. Alternatively, it is also possible to use a single demoulding manipulator set up to demould casting moulds at both demoulding stations 110 and 110'. In a preferred embodiment, the demoulding manipulator(s) has/each have two, three or more grabs, for example one grab for outer moulds, one grab for upper muffs and/or one grab for the finished product.

The features of this execution may, in further working examples, be combined individually or as a whole with features of the working examples described above and below.

Third Working Example

Figure 1C:
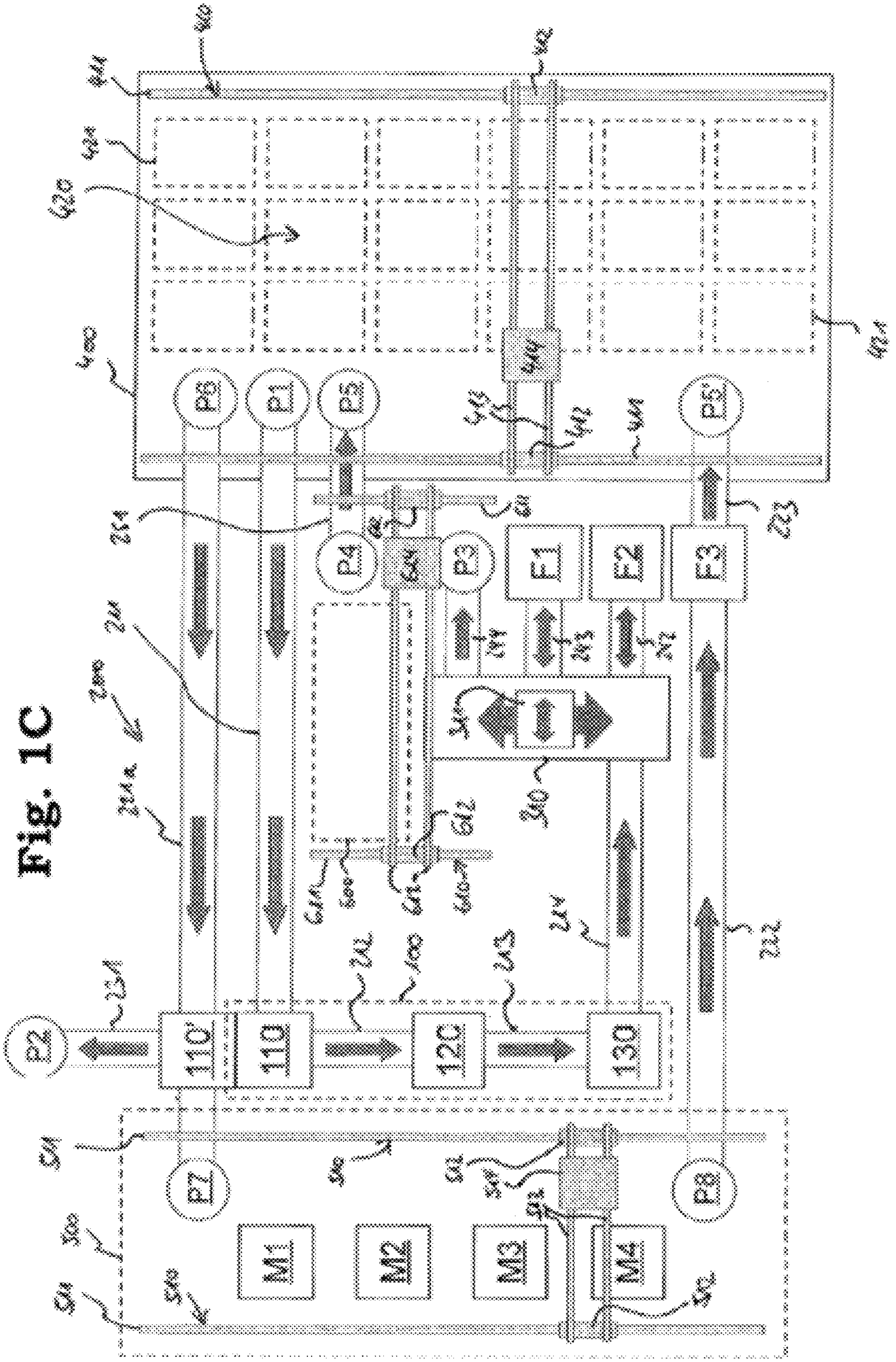
FIG. 1C shows, by way of example, a schematic top view of a system for producing concrete products by casting method in a third working example of the invention.

FIG. 1C shows, by way of example, a schematic top view of a system for producing concrete products by casting method in a third working example of the invention.

In this case—as in all illustrative embodiments—preferably at least the hardening area 420 of the automated circulation system is also additionally utilized efficiently for the casting moulds supplied from the manual assembly area 500.

By contrast with the above-described working examples and especially in contradistinction to the working example according to FIG. 1B, however, by way of example, in FIG. 1C, a dedicated filling station F3 is provided for casting moulds supplied from the manual assembly area 500.

A supply conveying section 222 of the conveying unit 200 supplies casting, moulds from the mould intake position P8 of the manual assembly area 500 of the filling station F3 (or, if desired, a multitude of filling stations with a dedicated transfer unit analogously to the further working examples), in order to fill the manually assembled casting mould in filling station F3 with concrete, preferably in an automated manner. A further conveying section 223 supplies, by way of example, the concrete-filled casting mould from the filling station F3 to a mould release position P5' for the hardening area 420 of the automated circulation system.

The features of this execution may, in further working examples, be combined individually or as a whole with features of the working examples described above and below.

Fourth Working Example

Figure 2A:
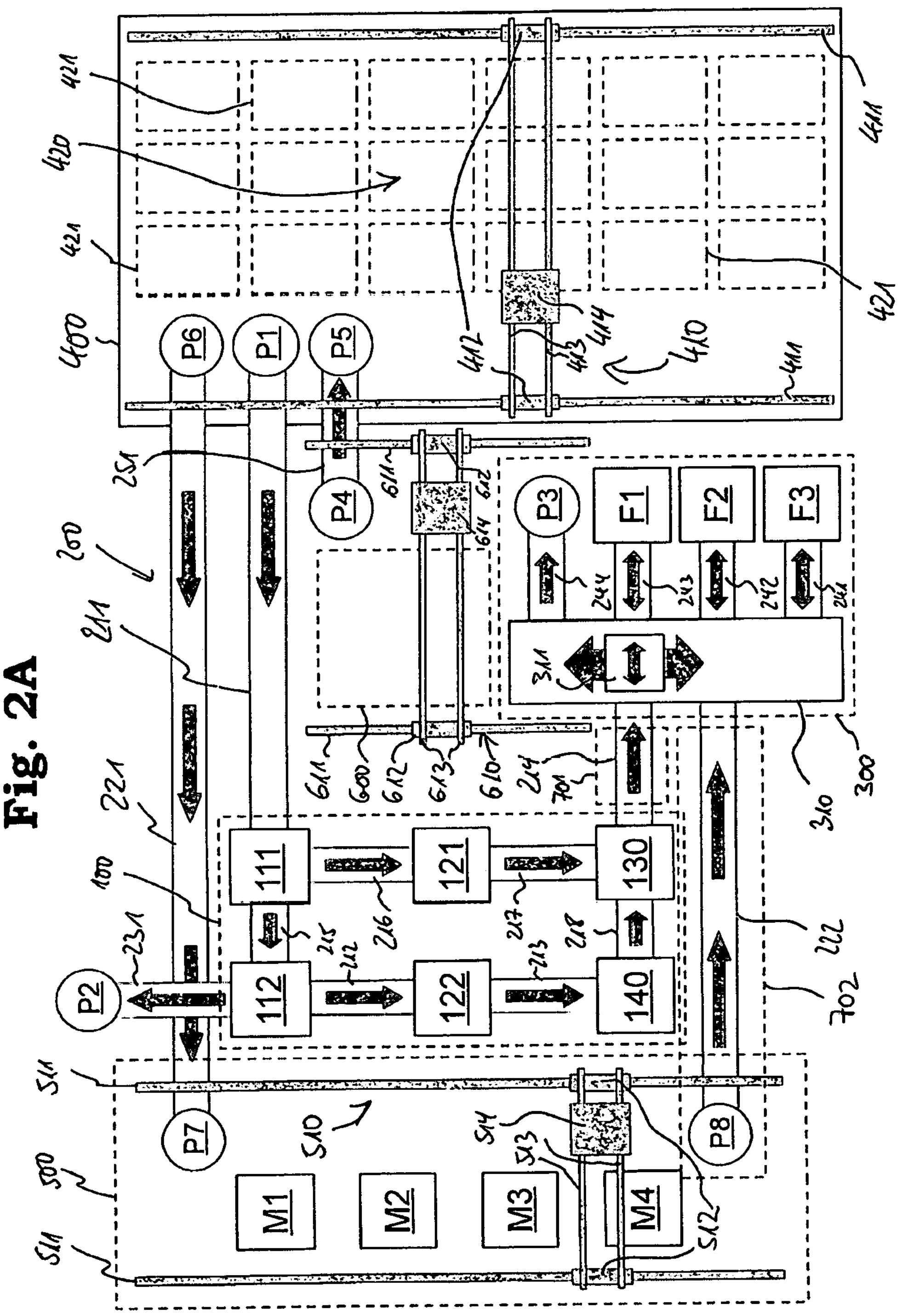
FIG. 2A shows, by way of example, a schematic top view of a system for producing concrete products by casting method in a fourth working example of the invention.

FIG. 2A shows a schematic top view of a system for producing tubular concrete products by way of example by casting method by way of example by means of upright casting mould by way of example in a fourth working example of the invention.

In contradistinction with the working example according to FIG. 1A, in this case, in the manufacturing area 100, a conveying line for the inner moulds and a parallel conveying line for outer moulds are shown. In this case, the respective mould cores (inner moulds) and outer moulds of the casting moulds, in this working example, between the demoulding station 111 and the mould assembly station 130, are conveyed in parallel lines for production purposes and are cleaned in the separately provided cleaning stations 121 and 122.

A first demoulding station 111 is set up by way of example to accept an outer mould of casting moulds to supply this separately by means of the conveying section 216 to the corresponding outer mould cleaning station 121, and the respective inner moulds and the product still disposed in the respective inner moulds are supplied by means of the conveying section 215 to the corresponding second demoulding station 112 that accepts the product and finally demoulds the casting mould.

In the working example according to FIG. 2A, the mould conveying unit 200 comprises by way of example especially a mould conveying section 211 by way of example for automated conveying of a filled and hardened casting mould from the mould intake position P1 to the first demoulding station 111.

In addition, the mould conveying unit 200 is set up by way of example to convey an outer mould removed at the first demoulding station 111 by means of a mould conveying section 216 to the outer mould cleaning station 121, to convey a mould core (inner mould) containing cured concrete product by means of a mould conveying section 215 from the first demoulding station 111 to the second demoulding station 112, to convey a hardened tubular concrete product removed at the second demoulding station 112 by means of a mould conveying section 231 to the product release position P2 (in order to release the finished concrete product and optionally supply it to further processing), and to convey a mould core (inner mould) from the second demoulding station 112 by means of a mould conveying section 212 to the mould core cleaning station 122 (inner mould cleaning station).

In addition, the mould conveying unit 200 is set up by way of example to convey a mould core (inner mould) from the mould core cleaning station 122 (inner mould cleaning station) by means of the mould conveying sections 213 and 218 (via an optional pre-assembly station 140) to the mould assembly station 130, and to convey an outer mould from the outer mould cleaning station 121 by means of a mould conveying section 217 to the mould assembly station 130.

This advantageously enables reduction in the cycle times of the system since the cleaning operations for mould core (inner mould) and outer moulds can be conducted separately and independently of one another and especially simultaneously.

The optional pre-assembly station 140 can be utilized here in order to assemble an inner mould from parts, or to assemble lower muffs and inner moulds. Alternatively or additionally, the pre-assembly station 140 can be utilized to fit or insert reinforcements or reinforcement cages onto inner moulds.

The features of this execution may, in further working examples, be combined individually or as a whole with features of the working examples described above and below.

Fifth Working Example

Figure 2B:
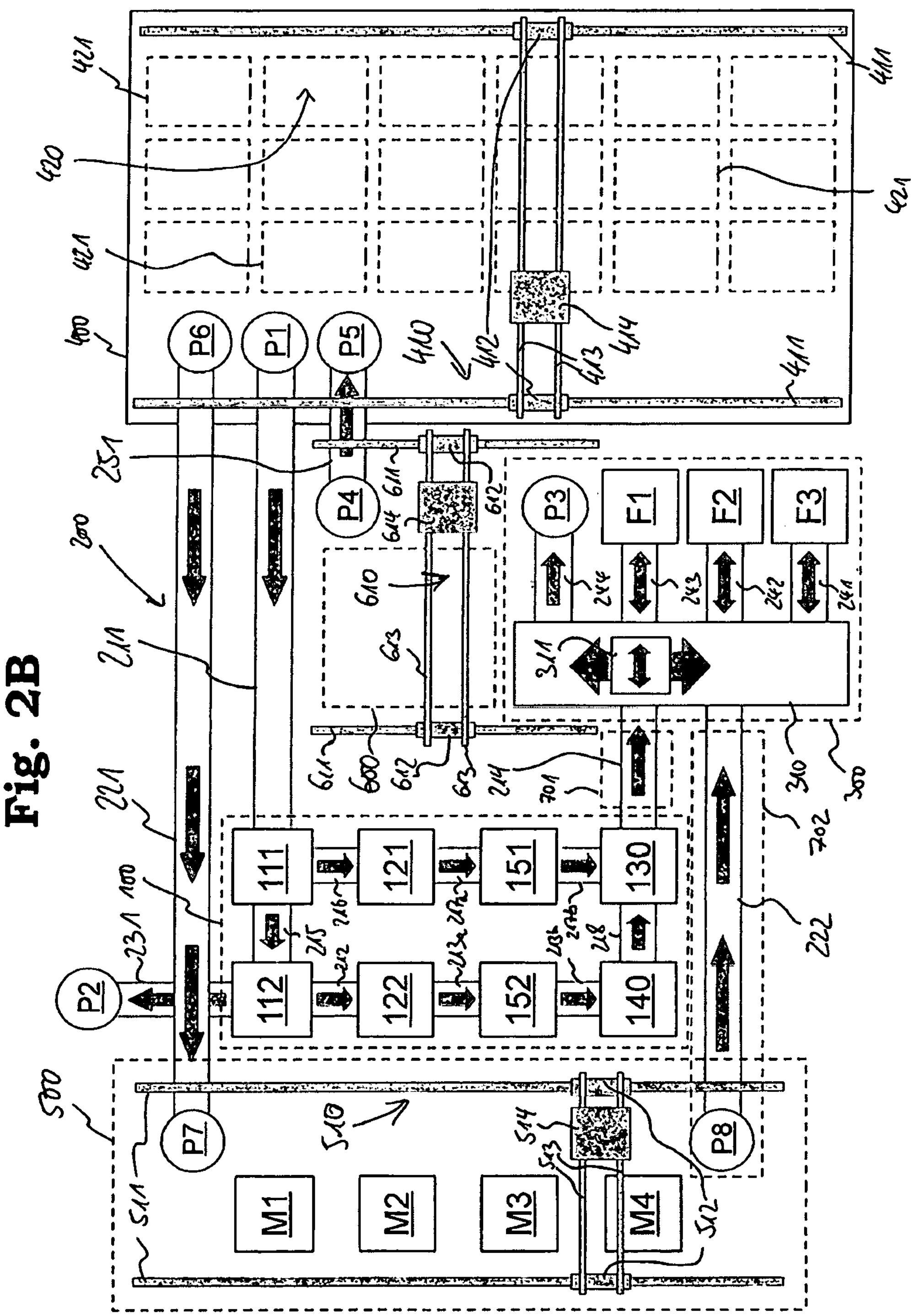
FIG. 2B shows, by way of example, a schematic top view of a system for producing concrete products by casting method in a fifth working example of the invention.

FIG. 2B shows a schematic top view of a system for producing tubular concrete products by way of example by a casting method by way of example by means of upright casting moulds by way of example in a fifth working example of the invention.

In contradistinction to the working example according to FIG. 2A, in this case, automated or program-controlled manufacturing stations 151 and 152 respectively are provided downstream of the respective cleaning stations 121 and 122 in the manufacturing area 100, with corresponding conveying sections 213*a* and 213*b*, and 217*a* and 217*b* respectively. The manufacturing stations 151 and 152 can be utilized for pre-assembly of inner or outer moulds, or preferably for preparation or oiling of inner and outer moulds (i.e. by way of example an outer mould oiling station 151 and/or an inner mould oiling station 152).

The features of this execution may, in further working examples, be combined individually or as a whole with features of the working examples described above and below.

Sixth Working Example

Figure 2C:
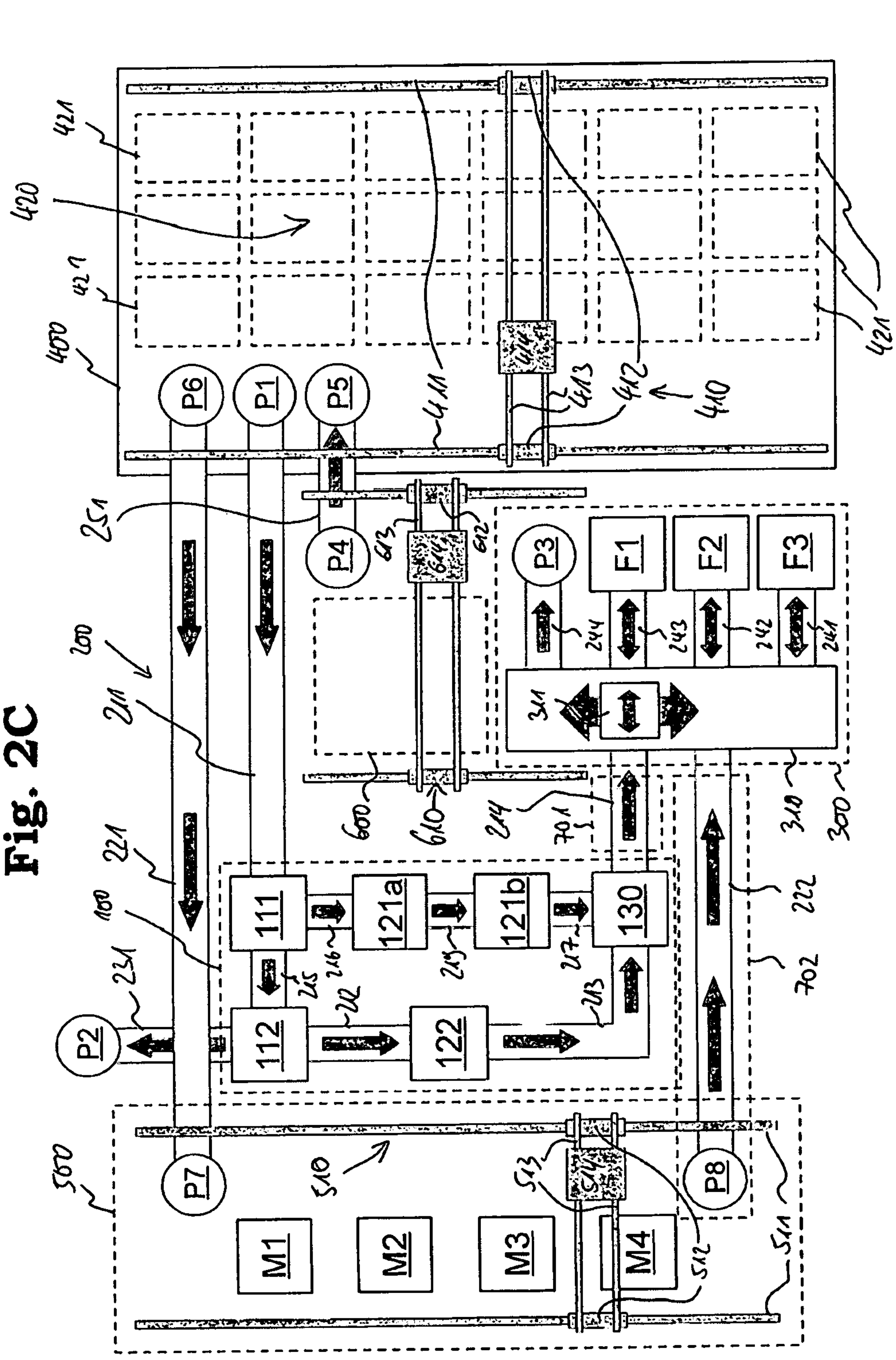
FIG. 2C shows, by way of example, a schematic top view of a system for producing concrete products by casting method in a sixth working example of the invention.

FIG. 2C shows a schematic top view of a system for producing tubular concrete products by way of example by a casting method by way of example by means of upright casting moulds by way of example in a sixth working example of the invention.

In contradistinction to the working example according to FIG. 2A, in this case, the optional pre-assembly station 140 is absent and two outer mould cleaning stations 121*a* and 121*b* are provided in series, with corresponding conveying sections 216, 219 and 217, such that the cleaning of the outer moulds can be conducted by way of example at two successive manufacturing stations 121_a_ and 121_b_.

This has the advantage that the line for the outer moulds and the line for the inner moulds have the same number of manufacturing stations and therefore respective inner moulds and outer moulds that belong to one another in pairs can be conveyed in parallel in the cycle of the synchronized circulation cycle from manufacturing station to manufacturing station in order to be simultaneously transported to the mould assembly station 130. In other working examples, it is also possible here for different numbers of manufacturing stations to be provided in the parallel lines for the inner and outer moulds, in which case any conveying sections can be used as buffers between manufacturing stations in order to transport inner and outer moulds in each case simultaneously to the mould assembly station 130.

The features of this execution may, in further working examples, be combined individually or as a whole with features of the working examples described above and below.

Seventh Working Example

Figure 3:
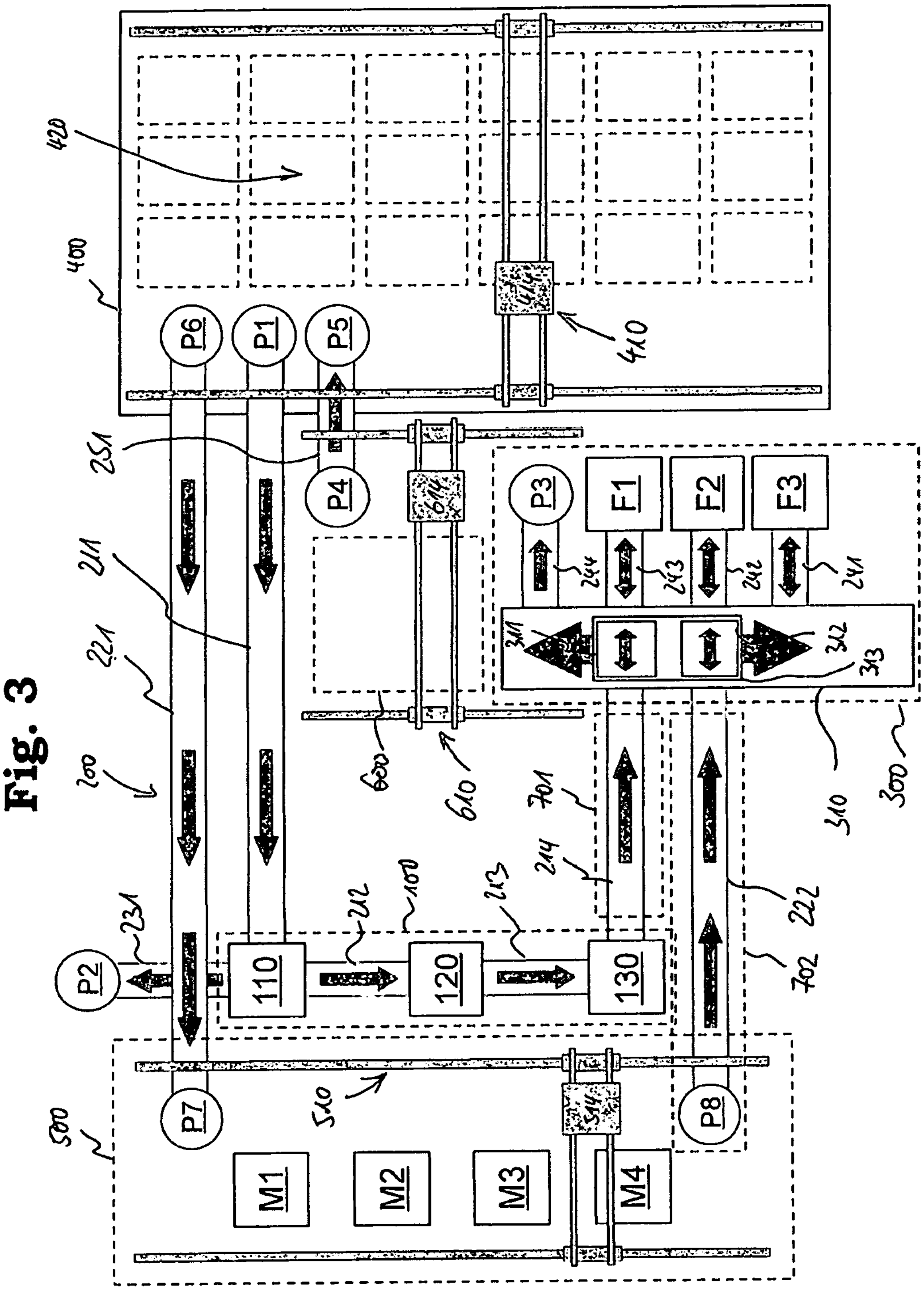
FIG. 3 shows, by way of example, a schematic top view of a system for producing concrete products by casting method in a seventh working example of the invention.

FIG. 3 shows a schematic top view of a system for producing tubular concrete products by way of example by a casting method by way of example by means of upright casting moulds by way of example in a seventh working example of the invention.

In contradistinction to the working example according to FIG. 1, in this case, the transfer unit 310 has been provided by way of example with a double slide table 313 having two slide tables 311 and 312 that are arranged alongside one another and movable together, where each slide table 311 and 312 is set up to accommodate casting moulds from the conveying sections 214 and 222 and supply the conveying sections 241 to 243 to the filling stations F1 to F3 and to accept these again after filling with concrete. The slide table 311 is additionally set up to supply casting moulds to the conveying section 244 for the mould release position or intermediate position P3.

This has the advantage that supplying of casting stations to the filling stations and the accommodation of filled casting moulds can be parallelized and hence conducted more efficiently.

The features of this execution may, in further working examples, be combined individually or as a whole with features of the working examples described above and below.

Eighth Working Example

Figure 4:
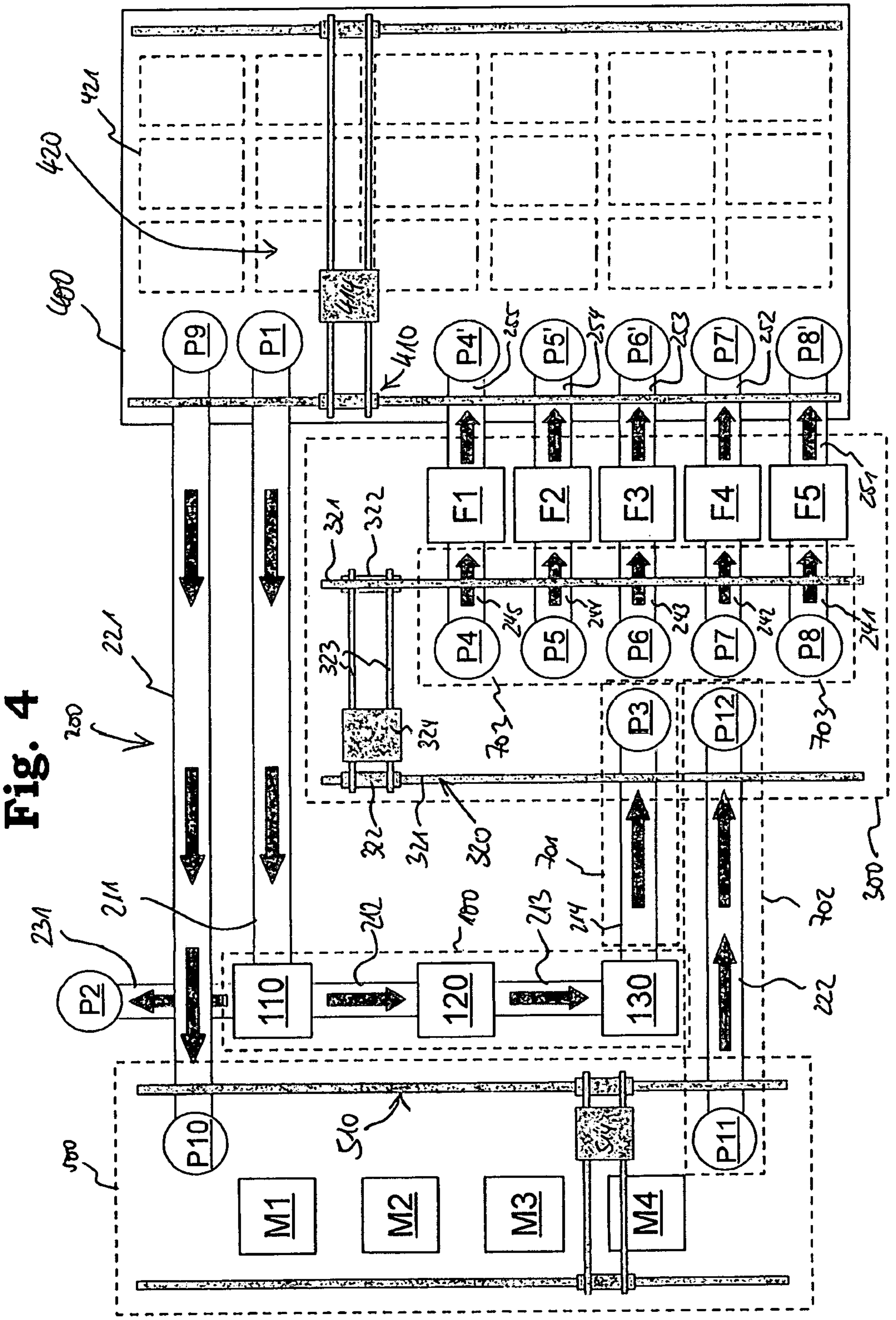
FIG. 4 shows, by way of example, a schematic top view of a system for producing concrete products by casting method in an eighth working example of the invention.

FIG. 4 shows a schematic top view of a system for producing tubular concrete products by way of example by a casting method by way of example by means of upright casting moulds by way of example in an eighth working example of the invention.

In contradistinction to the working example according to FIG. 1A, in this case, five filling stations F1 to F5 are provided. The conveying section 214 comprises, by way of example, one mould intake position P3 and the conveying section 222 comprises, by way of example, one mould intake position P12.

The mould conveying unit 200 additionally comprises, by way of example, one mould conveying section 245 for conveying a casting mould from the intermediate position P4 to the filling station F1 and a mould conveying section 255 for conveying a casting mould from the filling station F1 to the mould release position P4' in the hardening area 420, a mould conveying section 244 for conveying a casting mould from the intermediate position P5 to the filling station F2 and a mould conveying section 254 for conveying a casting mould from the filling station F2 to the mould release position P5' in the hardening area 420, a mould conveying section 243 for conveying a casting mould from the intermediate position P6 to the filling station F3 and a mould conveying section 253 for conveying a casting mould from the filling station F3 to the mould release position P6' in the hardening area 420, a mould conveying section 242 for conveying a casting mould from the intermediate position P7 to the filling station F4 and a mould conveying section 252 for conveying a casting mould from the filling station F4 to the mould release position P2' in the hardening area 420, and a mould conveying section 241 for conveying a casting mould from the intermediate position P8 to the filling station F5 and a mould conveying section 251 for conveying a casting mould from the filling station F5 to the mould release position P8' in the hardening area 420.

The mould conveying sections 241 to 245 here form a further buffer area 703 in which respective casting moulds, in addition to the buffer areas 701 and 702, can also be intermediately stored in a buffering manner individually upstream of the respective filling stations.

In addition, in this working example, the transfer unit provided, rather than a slide table, by way of example, was a transport unit 320 in order to transport casting moulds in the filling area 300. Alternatively or additionally, it is of course also possible here to provide a transfer unit with a slide table or double slide table (or else multiple slide table with more than two slide tables).

The transport unit 320 comprises, by way of example, a grab unit 324 (manipulator) which is guided by way of example on a first guide unit with guides 323, which is guided by way of example on a second guide unit that runs transverse thereto with guide blocks 322 guided on guides 321.

The transport unit 320 is set up by way of example to move the grab unit 324 by means of the guide units 321, 322 and 323 in the filling area 300 and to be able to accommodate casting moulds by means of the grab unit 324, and to be to transport accommodated casting moulds between the respective positions P3 or P21 and P4 to P8 in order to supply casting moulds from the mould conveying sections 214 or 222 to the respective filling station F1, F2, F3, F4 or F5, according to occupation control.

More particularly, the transport unit 320 is set up by way of example to accommodate a casting mould at the mould release position P3 or P12 in an automated or program-controlled manner and to transport it in an automated or program-controlled manner to one of positions P4 to P8.

The features of this execution may, in further working examples, be combined individually or as a whole with features of the working examples described above and below.

Ninth Working Example

Figure 5:
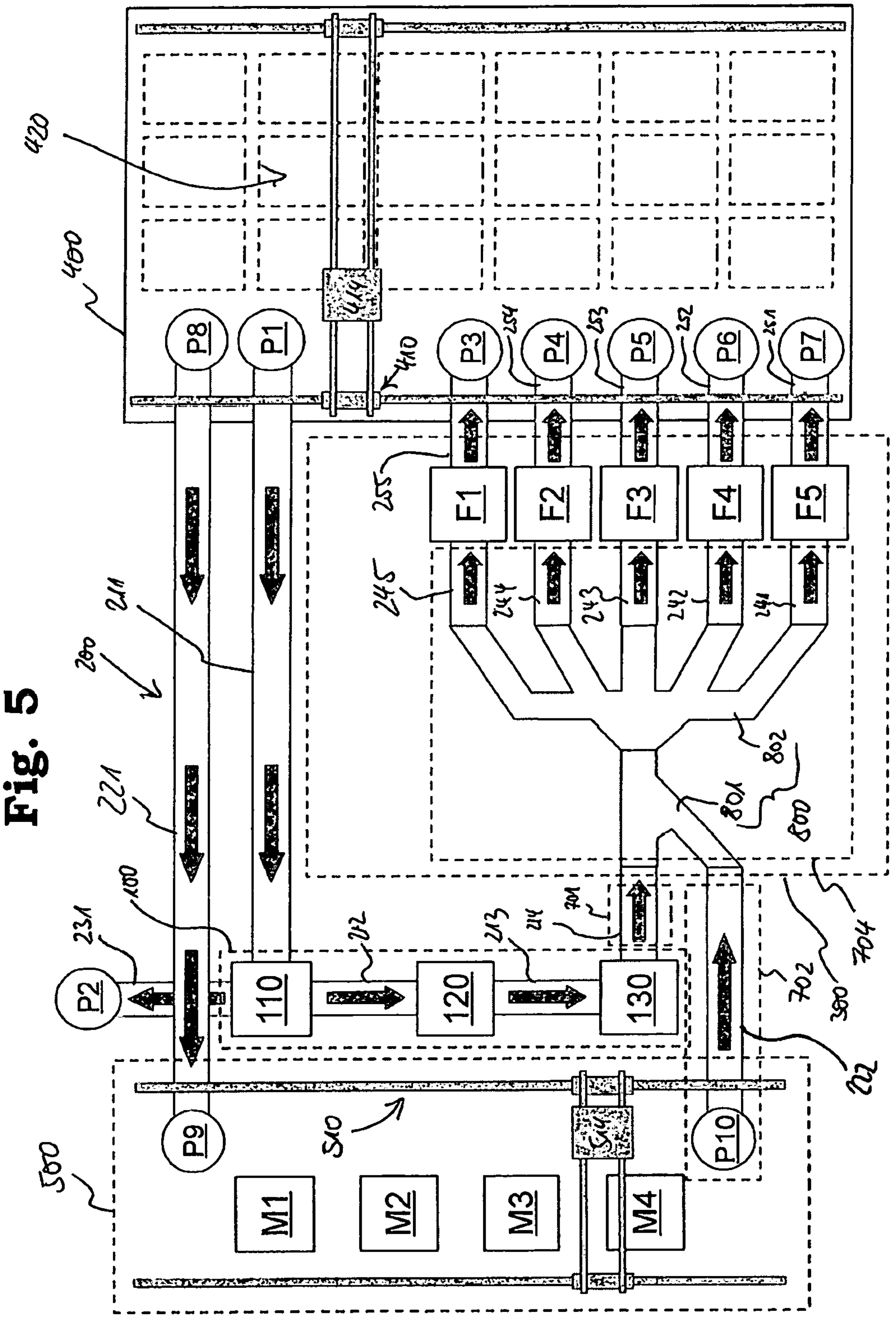
FIG. 5 shows, by way of example, a schematic top view of a system for producing concrete products by casting method in a ninth working example of the invention.

FIG. 5 shows a schematic top view of a system for producing tubular concrete products by way of example by a casting method by way of example by means of upright casting moulds by way of example in a ninth working example of the invention.

In contradistinction to the working example according to FIG. 1A, in this case, five filling stations F1 to F5 are provided. In addition, rather than the transfer unit 310 with a slide table 311, by way of example, an automated or program-controlled conveying section deflector system 800 with deflector sections 801 and 802 is provided.

The deflector section 801 is set up to consolidate the conveying sections 214 and 222 in the manner of a deflector system, and especially to convey, by automated or program-controlled deflector control of the deflector section 801, casting moulds in each case from the conveying section 214 from the automatic circulation cycle or from the conveying section 222 from the manual assembly area 500 to the deflector section 802.

The mould conveying unit 200 additionally comprises, by way of example, a mould conveying section 245 for conveying a casting mould from the deflector section 802 to the filling station F1 and a mould conveying section 255 for conveying a casting mould from the filling station F1 to the mould release position P3 in the hardening area 420, a mould conveying section 244 for conveying a casting mould from the deflector section 802 to the filling station F2 and a mould conveying section 254 for conveying a casting mould from the filling station F2 to the mould release position P4 in the hardening area 420, a mould conveying section 243 for conveying a casting mould from the deflector section 802 to the filling station F3 and a mould conveying section 253 for conveying a casting mould from the filling station F3 to the mould release position P5 in the hardening area 420, a mould conveying section 242 for conveying a casting mould from the deflector section 802 to the filling station F4 and a mould conveying section 252 for conveying a casting mould from the filling station F4 to the mould release position P6 in the hardening area 420, and a mould conveying section 241 for conveying a casting mould from the deflector section 802 to the filling station F5 and a mould conveying section 251 for conveying a casting mould from the filling station F5 to the mould release position P7 in the hardening area 420.

The mould conveying sections 241 to 245 here, with the deflector section 802 and also the deflector section 801, form a further buffer area 704 in which respective casting moulds, in addition to the buffer areas 701 and 702, can also be intermediately stored individually in a buffering manner upstream of the respective filling stations or in the deflector sections 801 or 802.

The deflector section 802 is set up to combine the deflector section 801 and the conveying sections 241 to 245 in the manner of a deflector system, and especially to convey, by automated or program-controlled deflector control of the deflector section 802, casting moulds in each case from the deflector section 801 to one of the mould conveying sections 241 to 245 in each case.

The features of this execution may, in further working examples, be combined individually or as a whole with features of the working examples described above and below. More particularly, the deflector section 801 and/or the deflector section 802 may individually or together be provided alternatively or additionally in any of the other working examples, for example in the form of a combination of a slide table and/or a transport unit in one of the above working examples with a deflector section 801, or in the form of a combination of a slide table and/or a transport unit in one of the above working examples with a deflector section 802.

System Control

There follows a description of function controls and system controls or occupation controls in a production system, where the system may be implemented according to one of the above execution features or in the form of a combination of features of the above execution features. The flow diagrams which follow may correspond to a program controller or a program execution by a programmed controller. Such control processes may be implemented by a commercial computer with a CPU or one or more processors, or else with internal or external storage media programmed correspondingly.

Figure 6:
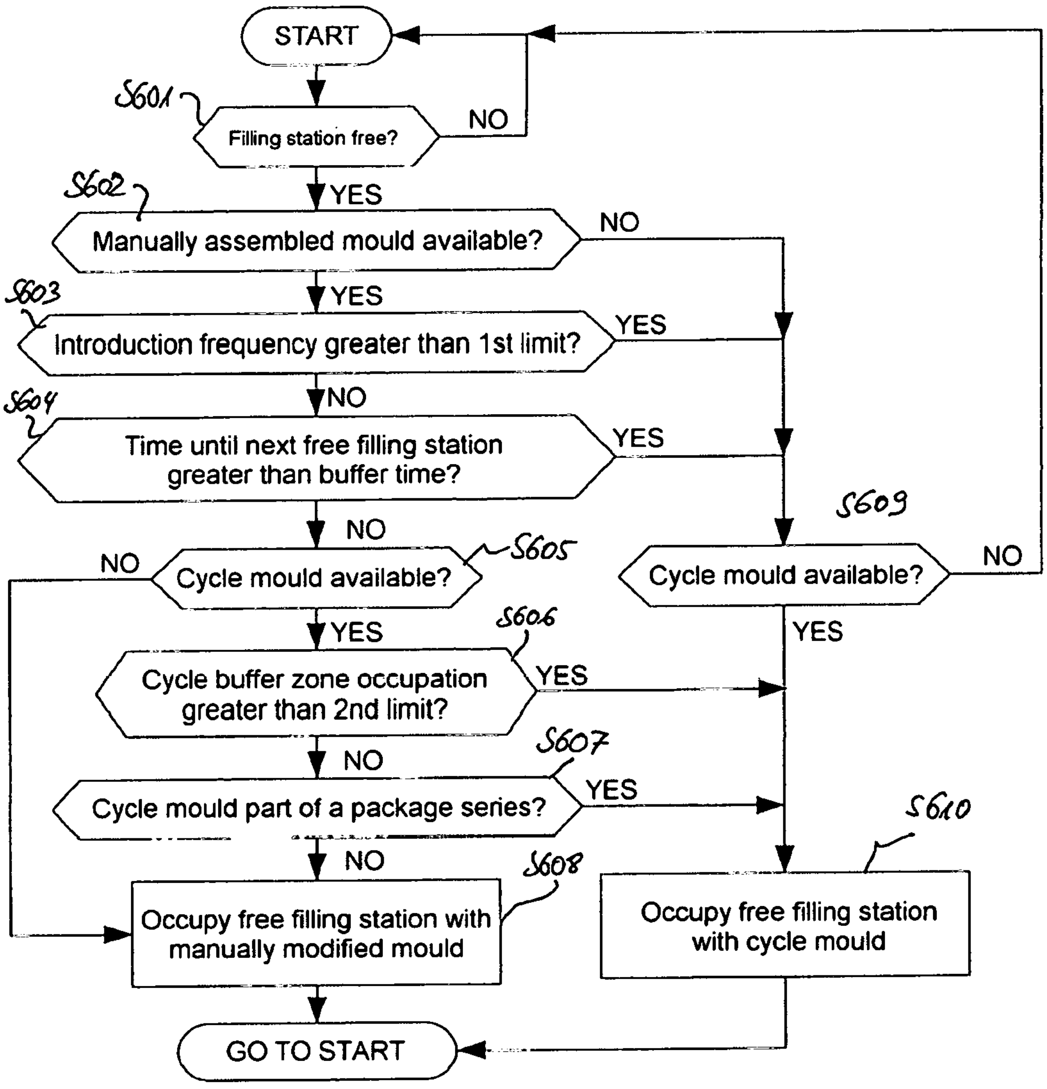
FIG. 6 shows, by way of example, a flow diagram of a method for control of filling station supply in a production system in one working example of the invention.

FIG. 6 shows, by way of example, a diagram of a method of controlling the filling station supply in a production system in one working example of the invention.

In a system with one or more filling stations (e.g. F1 to F3 or F1 to F5), a step S601 checks, determines or detects whether one of the filling stations is free or has become free. A filling station becomes free or is considered to have become free, for example, when a casting mould that has been poured there or a filled casting mould has been filled completely with free-flowing concrete, i.e. especially when the residual pouring time has expired and the filling with concrete is stopped, for example in an automated manner, and the filled casting mould is transported away in order to be supplied to the hardening area 420. If the step gives NO (i.e. when all filling stations are occupied or filled and casting moulds are being filled in each case), the operation is repeated until step S601 gives YES and a filling station has become free.

Step S602 checks, determines or detects whether a manually assembled casting mould is available, i.e., for example, whether a manually assembled casting mould has been brought from the manual assembly area 500 to the transfer unit or is awaiting automated filling in the buffer area 702 or 703. If step S602 gives NO, when no manually assembled casting mould is ready for filling, a step S609 checks, determines or detects whether a casting mould assembled in an automated manner (called a cycle mould) is available, i.e., for example, whether a casting mould assembled in an automated manner has been brought from the manufacturing area 100 to the transfer unit or is awaiting automated filling in the buffer area 701.

If step S609 gives NO, step S601 is conducted again. If step S609 gives YES, the next available cycle mould is supplied in step S610 from the buffer area 701 from the filling station that has become free in order to be filled there with pourable concrete in an automated manner. The controller here controls step S610 in which the filling station that has become free is occupied by the available cycle mould. For this purpose, the controller can control the predetermined filling time and/or the predetermined concrete formulation in the filling station, optionally on the basis of shift data or casting mould data that are stored in or have to be input into the controller.

If step S602 gives YES, i.e. when a manually assembled casting mould is ready for filling, a step S603 calculates, checks, determines or detects whether an introduction frequency (for example in units of the number of manually assembled moulds introduced per unit time) of manually assembled casting moulds is greater than a first limit, and when the first limit is exceeded by the introduction frequency ascertained (step S603 gives YES), step S609 is conducted again and, more particularly, the manually assembled mould is not sent to one of the filling stations at present.

In this case, the introduction frequency may be a parameter that can directly or indirectly specify how many manually assembled moulds have been introduced into the circulation cycle or into the filling area in a particular past time interval or on average over a predetermined period of time.

The first limit here may preferably have been predetermined in such a way that, during a predetermined period of time, for example in the course of the current shift, it can be guaranteed that the automated circulation cycle does not have to stop, or at least a probability that the circulation cycle has to stop in the course of the shift or period of time is below a limit when the introduction frequency of the manually assembled casting moulds remains below the first limit.

Practical example: in the case of a shift duration T with a cycle time T1 (or average cycle time T1) in the automated circulation cycle (i.e. when exactly or an average of one further cycle mould is transferred from the mould assembly station 130 to the buffer area 701 after each period of time T1), let us assume that the system comprises N>0 filling stations and the pouring time (the average if appropriate) of the cycle moulds is T2, the pouring time (the average if appropriate) of the manually assembled casting moulds is T3 and the times T1, T2 and T3 are each much smaller than the shift duration T (e.g. T1, T2 and T3 are each less than 20 min and the shift duration T is greater 2 to 8 hours).

Thus, the number of cycle moulds provided in the shift duration T is about T/T1 given a (supply) frequency (the average if appropriate) of 1/T1, and the number of pourable cycle moulds in the shift duration T is about (N×T)/T2 given a (pouring) frequency (the average if appropriate) of N/T2. In order to ensure that the cycle need not be interrupted, the number N of filling stations should preferably be chosen such that T/T1 is less than (N×T)/T2 (i.e. the number of cycle moulds provided is less than the number of cycle moulds pourable in the same period of time T), or the frequency (the average if appropriate) 1/T1 is less than the frequency (the average if appropriate) N/T2. More particularly, the number N of filling stations should preferably be chosen such that N>T2/T1.

Thus, however, potentially T/T1 cycle moulds are provided (and poured) during the shift, although actually (N×T)/T2>T/T1 cycle moulds could be poured, such that, on average, a total holdup time in the filling stations of the filling area of T×[1−(T2/(N×T1))] can be expected since it would be possible in the shift T, on average, to pour about [((N×T)/T2)−(T/T1)] more cycle moulds than are provided and poured by the circulation cycle. The fraction of the shift duration T in which the filling stations, i.e. at least one of the filling stations in each case, are expected to remain unutilized is thus about [1−(T2/(N×T1))], and so this enables a maximum value of a potential window for the filling/casting of manually assembled casting moulds without causing a holdup in the circulation cycle or the cycle of the manufacturing stations in the manufacturing area 100.

In addition, the pouring frequency (the average if appropriate) of the manually assembled stations is potentially N/T3, such that, in the maximum available time T×[1−(T2/(N×T1))] per shift duration T, a maximum of (T/T3)×[N−(T2/T1)] manually assembled moulds may be poured, i.e., on average, with a maximum introduction frequency of [N−(T2/T1)]/T3 (as the maximum of the first limit). Overall, it would thus be possible in the shift duration T to introduce a maximum of (T/T3)×[N−(T2/T1)] by means of the transfer unit into the circulation cycle without causing a holdup in the circulation cycle or in the cycle of the manufacturing stations in the manufacturing area 100. For safety reasons, the first limit may optionally be set lower than the maximum introduction frequency of [N−(T2/T1)]/T3 and may be stored or calculated in the controller, and/or else displayed on any display screens in the manual assembly stations.

Alternatively or additionally to the above-described step S603, it is possible to check, in a further step S604, whether the time until the next free filling station (i.e., for example, the minimum residual pouring time of the filling stations that are currently filling) is greater than a predetermined buffer time that can be predetermined, for example, on the basis of the times T1 and/or T2 or can be ascertained on the basis of the current buffer occupation in the buffer area 701 and on the basis of the times T1 and T2, on the basis of the proviso that the time until the next free filling station is less than the time before maximum occupation in the buffer area 701. In this case, it is possible, for example, in simple working examples to calculate the buffer time as buffer time=T1 or as n×T1 with n>1.

If at least one of steps S603 and S604 gives YES, step S609 is conducted in order to supply any available cycle mould rather than the manually assembled casting mould to the filling area or to the filling station that has become free.

If both steps S603 and S604 give NO, step S605 checks, determines or detects whether a casting mould assembled in an automated manner (called a cycle mould) is available, i.e., for example, whether a casting mould assembled in an automated manner has been brought from the manufacturing area 100 to the transfer unit or is awaiting automated filling in the buffer area 701. If step S605 gives NO, it is then possible, in step S608, to directly supply the available manually assembled casting moulds to the filling station that has become free.

The next available manually assembled casting mould is supplied in step S608 from the buffer area 702 from the filling station that has become free in order to be filled there with pourable concrete in an automated manner. The controller here controls step S608 in which the filling station that has become free is occupied by the available casting mould. For this purpose, the controller can control the predetermined filling time and/or the predetermined concrete formulation at the filling station, optionally on the basis of shift data or casting mould data that are stored in or have to be input into the controller, or on the basis of data that a user has input into a computer controller or input station in the manual assembly of the casting mould at the respective assembly station M1 to M4 of the manual assembly region 500.

If step S605 gives YES, it is optionally possible for one or two further steps to check, determine or detect whether the available cycle mould is nevertheless supplied to the filling area 300 or the filling station that has become free instead of the available manually assembled casting mould.

By way of example, a step S606 can check, determine or detect whether a cycle buffer zone occupation is greater than a second limit, especially in order to ascertain, for example, whether there is still at least a predeterminable number of K>0 free buffer zone positions available in the buffer area 701 or whether the number of occupied buffer zone positions in the buffer area 701 does not exceed a maximum value or maximum percentage in relation to the total number of buffer positions.

In a further optional step S608, it is preferably possible to check whether the available cycle mould is the last (and/or second-from-last and/or third-from-last) casting mould in a cycle mould package series, i.e. in order not to interrupt the package series that has already started and preferably to conclude it before the manually assembled casting mould is supplied to the filling stations.

Only when both optional steps S606 and S607 give NO is step S608 executed, and the available manually assembled casting mould is supplied from the buffer area 702 from the filling station that has become free in order to be filled there with pourable concrete in an automated manner. Otherwise, rather than the manually assembled casting mould, the available cycle mould is nevertheless supplied to the filling station that has become free (step S610).

Figure 7:
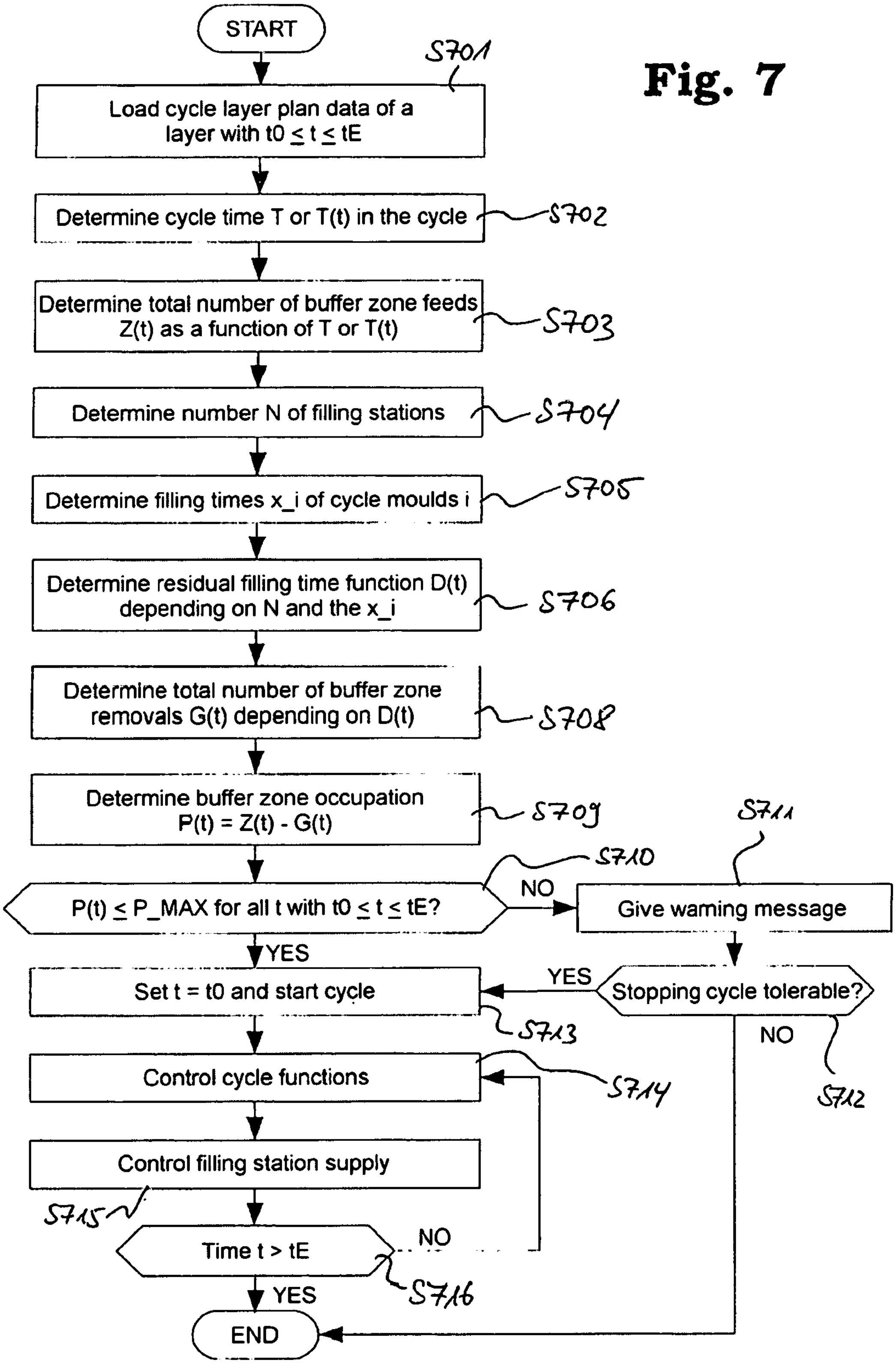
FIG. 7 shows, by way of example, a flow diagram of a method for control of a production system in one working example of the invention.

FIG. 7 shows, by way of example, a diagram of a method of controlling a production system in one working example of the invention.

In step S701, prior to commencement of the shift and prior to activation of the automated circulation cycle, cycle shift plan data of a shift with t0 (or 0)≤t≤tE are loaded. The shift plan data can be prestored by a shift manager or input by an automated controller. The shift plan data preferably contain data that specify the total shift duration, the number N of available filling stations, the cycle time(s), the pourable cycle moulds, optionally with their predetermined sequence, the respective pouring times and/or pouring volumes and/or, if appropriate, their predetermined concrete formulations.

In step S702, the loaded cycle shift plan data are used to determine the cycle time T in the cycle (or, in the case of different cycle times over the shift duration, the course of the cycle time T(t) against time).

In step S703, a control function Z(t) variable with time or control function values Z(t) variable with time for the total buffer zone supply number Z is determined as a function of time t during the shift. This corresponds to the total number Z of cycle moulds supplied from the automated manufacturing area to the buffer area 701 up to the time t since the start of the shift (if appropriate plus the casting moulds/cycle moulds from the preceding shift that were already disposed in the buffer area 701 at the start of the shift). The control function values Z(t) of the total buffer zone supply number Z as a function of time t during the shift grows monotonously with time t, since the number supplied to the buffer area 701 grows by the number one after each cycle time without holdup in the circulation cycle.

Figure 9:
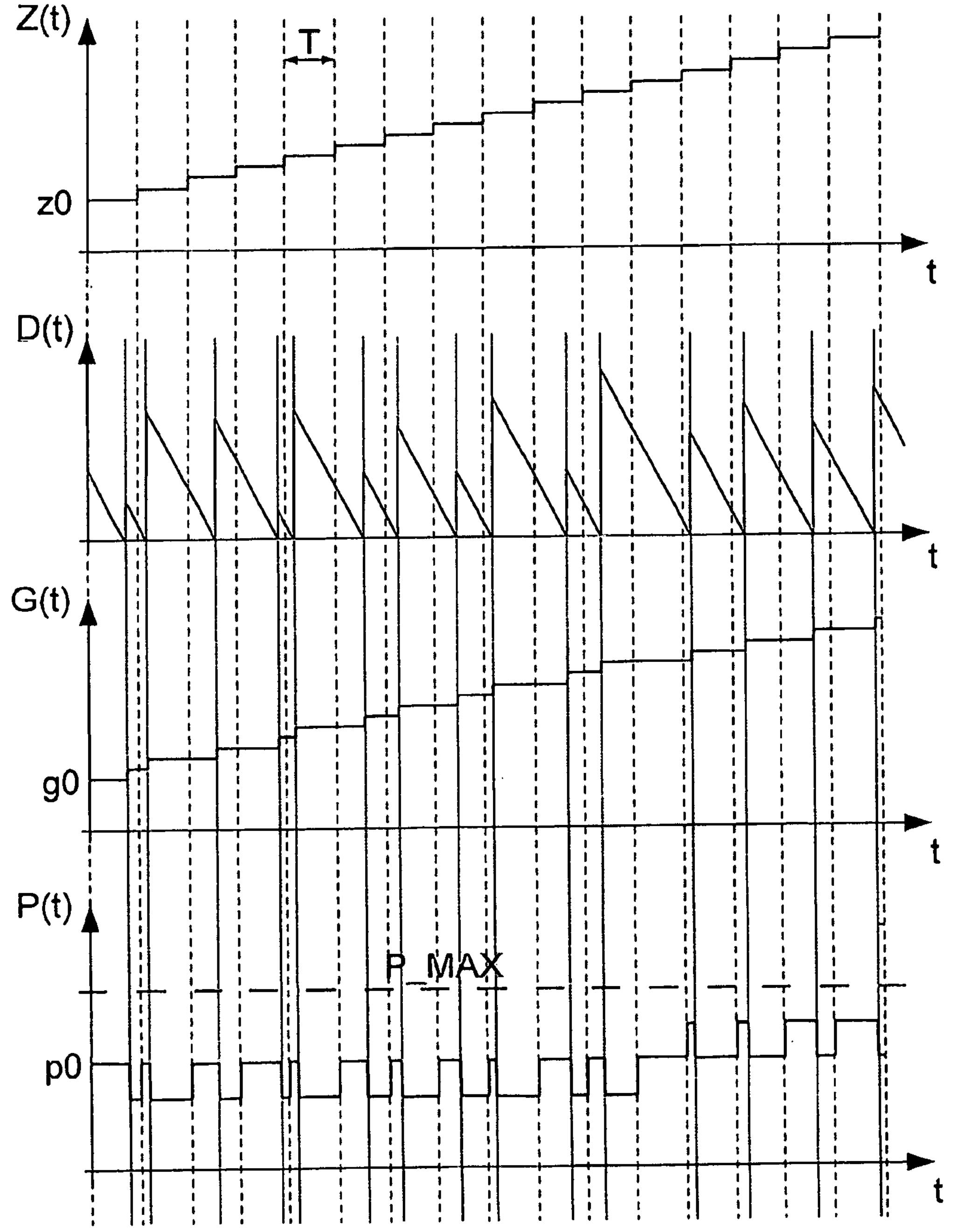
FIG. 9 shows illustrative plots of control function values against time in a control method according to FIGS. 7 and/or 8.

FIG. 9 shows illustrative plots of control function values against time in a control method according to FIGS. 7 and/or 8.

In this figure, the upper plot shows an illustrative evolution of the total buffer zone supply number Z(t) against time as a function of time t during the shift from an illustrative juncture t0 with an illustrative starting number of z0 casting moulds in the buffer area 701. The cycle time T is constant by way of example and, after each time t, Z(t) grows by the number one.

In step S704 in FIG. 7, the number N of available filling stations is determined and, in step S705, the respective filling times x_i of the cycle moulds i (with illustratively predetermined sequence i=1, 2, 3, . . . ) are read out or determined from the shift data plan. Assuming that the N filling stations are each constantly filled repeatedly with cycle moulds i as soon as a filling station has become free, in step S706, a residual filling time function D(t) is ascertained as a function of N and respective filling times x_i as a function of time, where the residual filling time function D(t) preferably states the time before the next free filling station at each time t. This residual filling time function D(t) in each case falls monotonously with time t and, at each zero point, jumps to x_i when the next cycle mould i is then supplied to the filling station that has become free.

In this context, it is possible to use the corresponding filling times x_i and the juncture of occupation of a filling station with the respective cycle mould i for each filling station j (j=1, 2, . . . , N) to ascertain a residual pouring time α_j or α_j(t), where the residual filling time function D(t) is given each case by the minimum residual pouring time α_j before the next filling station becomes free. Thus, the residual filling time function D(t) is given as D(t)=min (α_1, . . . , α_j, . . . , α_N).

In FIG. 9, the second plot from the top shows an illustrative evolution of the residual filling time function D(t) as a function of time t during the shift from an illustrative juncture t0. At any juncture when the residual filling time function D(t) drops to zero, a casting mould has been completely filled and a next casting mould can be supplied to the filling station that has become free, and at this juncture the residual filling time function D(t) jumps to the value corresponding to the residual filling time at the next filling station that becomes free.

In step S708 in FIG. 7, a total buffer zone removal number G(t) is determined as a function of the residual filling time function D(t). The total buffer zone removal number G(t) corresponds to the total number G of cycle moulds supplied from the buffer area 701 to the filling area at the time t since the start of the shift (if appropriate plus the moulds already transferred out of buffer area 701 into the filling area at the start of the shift). The control function values G(t) of the total buffer zone removal number G as a function of time t during the shift grow monotonously with time t since the number removed from the buffer area 701 grows by the number one every time the residual filling time function D(t) drops to zero, and a casting mould has been completely filled and a next casting mould can be supplied to the filling station that has become free.

The third plot from the top in FIG. 9 shows an illustrative evolution of the total buffer zone removal number G(t) as a function of time t during the shift from an illustrative juncture t0 with an illustrative starting number of g0. The control function values G(t) of the total buffer zone removal number G grow by the number one every time the residual filling time function D(t) drops to zero.

In step S709, in FIG. 7, a buffer zone occupation number P(t) is determined as a function of time t, on the basis of the difference between Z(t) and G(t) according to steps S706 and S708. Buffer zone occupation number P(t) corresponds here by way of example to the number of casting moulds from the automated circulation cycle that are being stored intermediately in the buffer area 701.

The lower plot in FIG. 9 shows an illustrative evolution of the buffer zone occupation number P(t) as a function of time t during the shift from an illustrative juncture to with an illustrative starting number of p0 of casting moulds present in the buffer area 701 before time t0. The control function values P(t) of the buffer zone occupation number P grow by the number one every time the total buffer zone supply number Z(t) grows by the number one, and fall by the number one every time the total buffer zone removal number G(t) grows by the number one.

Step S710 in FIG. 7 ascertains, checks or detects whether the buffer zone occupation number P(t) ascertained, for the total relevant period of time, for example in the shift from the start of the shift to the end of the shift or from t0 to tE, exceeds a maximum buffer zone occupation number P_MAX, or whether the buffer zone occupation number P(t) ascertained for the total relevant period of time, for example in the shift from the start of the shift to the end of the shift or from t0 to tE, remains less than or equal to the maximum buffer zone occupation number P_MAX, i.e. whether P(t) ≤P_MAX for all t.

If step S710 gives NO, i.e. when the buffer zone occupation number P exceeds the maximum buffer zone occupation number P_MAX at least at one juncture, an at least potential cycle stop has to be expected owing to full occupation of the available buffer space, and, in step S711, a warning message is issued. This can stop the controller or alternatively lead to checking or determination in an optional further step S712 as to whether a cycle stop is tolerable in the shift, for example on the basis of presettings in the cycle shift plan data.

If step S712 or step S710 gives YES, in step S713, the time is set to reset t0 and the circulation cycle is started automatically, meaning that, in the manufacturing area 100 and in the filling area 300, cycle moulds are processed in an automated manner and guided from manufacturing station to manufacturing station.

If the time t is less than the shift duration tE (step S716 gives NO), steps S714 of the control of the cycle functions (e.g. conveying sections, synchronization cycles, manufacturing stations) and S715 of the control of the filling station supply by means of the transfer unit (for example according to FIG. 6 or FIG. 8) are controlled.

Figure 8:
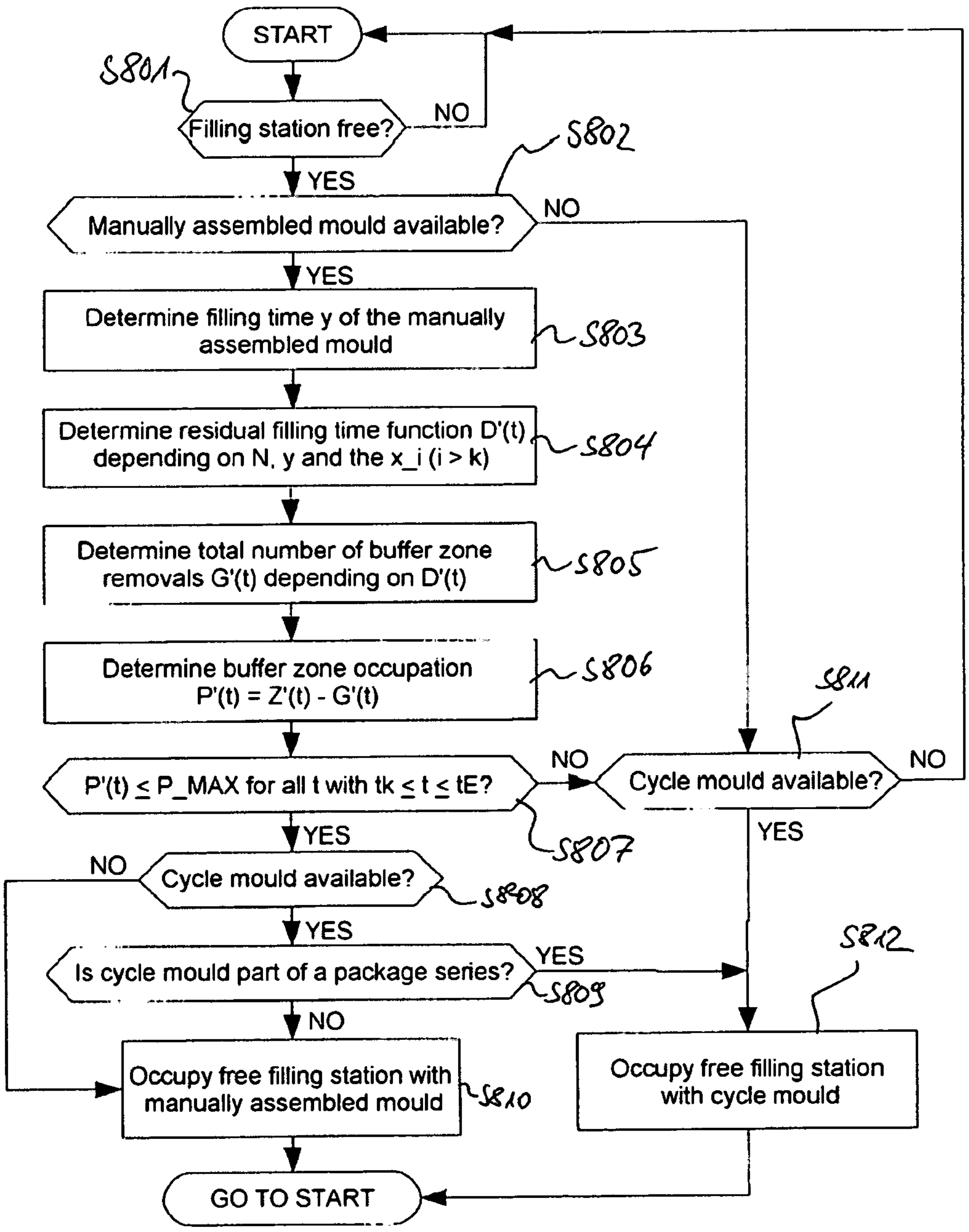
FIG. 8 shows, by way of example, a flow diagram of a method for control of filling station supply in a production process in one working example of the invention.

FIG. 8 shows, by way of example, a flow diagram of a method of controlling the filling station supply in a production system in one working example of the invention.

In a system having one or more filling stations (e.g. F1 to F3 or F1 to F5), a step S801 checks, determines or detects whether one of the filling stations is free or has become free. A filling station becomes free or is considered to have become free when a casting mould that has been poured there or filled casting mould has been filled completely with free-flowing concrete, i.e. more particularly when the residual pouring time has elapsed and the filling with concrete is stopped, for example in an automated manner, and the filled casting mould is transported away in order to be supplied to the hardening area 420. If the step gives NO (i.e. when all filling stations are occupied and filled and casting moulds are being filled in each case), the operation is repeated until step S801 gives YES and a filling station has become free.

Step S802 checks, determines or detects whether a manually assembled casting mould is available, i.e., for example, whether a manually equipped casting mould has been brought from the manual assembly area 500 to the transfer unit or is awaiting automated filling in the buffer area 702 or 703. If step S802 gives NO, when no manually assembled casting mould is ready for filling, a step S811 checks, determines or detects whether a casting mould assembled in an automated manner (called a cycle mould) is available, i.e., for example, whether a casting mould assembled in an automated manner has been brought from the manufacturing area 100 to the transfer unit or is awaiting automated filling in the buffer area 701.

If step S811 gives NO, step S801 is conducted again. If step S811 gives YES, the next available cycle mould is supplied in step S812 from the buffer area 701 from the filling station that has become free in order to be filled there with pourable concrete in an automated manner. The controller here controls step S812, in which the filling station that has become free is occupied with the available cycle mould. For this purpose, the controller can control the predetermined filling time and/or the predetermined concrete formulation at the filling station, optionally on the basis of shift data or casting mould data that have been recorded in or have to be input into the controller.

If step S802 gives YES, i.e. when a manually assembled casting mould is ready for filling, a step S803 ascertains a filling time or pouring time y for this manually assembled mould, for example on the basis of data that have been input by the manual user in the manual assembly station, or on the basis of data that have been calculated on the basis of an internal volume of the manually assembled casting mould.

A step S804, on the basis of the number N of available filling stations, the pouring time y ascertained for this manually assembled mould and the filling times x_i of the cycle moulds i that have been specified in shift plan data (with illustratively predetermined sequence i=1, 2, 3, . . . ), calculates a potential residual filling time function D'(t) from the current juncture t until the end of the shift or until a predetermined duration T with end time tE has elapsed, assuming that the manually assembled casting mould is conveyed to the next filling station that becomes free and supplied thereto for filling. This corresponds essentially to a calculated simulation of the residual filling time function D'(t) assuming that the next filling station that becomes free, rather than being occupied by the next cycle mould, would instead be occupied by the manually assembled casting mould.

Analogously to steps S706 to S710, in step S805, assuming that the N filling stations are first filled with the manually assembled casting mould and then constantly filled repeatedly with cycle moulds i as soon as a filling station has become free, step S805 ascertains the residual filling time function D'(t) as a function of N and respective filling times y and x_i as a function of time, where the residual filling time function D(t) again preferably states the duration until the next free filling station at each time t.

Step S805 in FIG. 8 determines the potential total buffer zone removal number G'(t) as a function of the plot of the residual filling time function D'(t), and step S806 in FIG. 8 determines the potential buffer zone occupation number P'(t) as a function of time t, on the basis of the difference between Z(t) and G'(t) according to steps S706 and S805.

Step S807 in FIG. 8 ascertains, checks or detects whether the potential buffer zone occupation number P'(t) ascertained exceeds the maximum buffer zone occupation number P_MAX for the entire period of relevance, for example until the end of the shift or until tE, or whether the buffer zone occupation number P'(t) ascertained remains less than or equal to the maximum buffer zone occupation number P_MAX, i.e. whether P'(t) P_MAX for all t for the entire period of relevance.

If step S807 gives NO and a cycle mould is available (step S811 gives YES), step S812 determines that the next filling station that becomes free or the filling station that has become free should be occupied by the cycle mould. If no cycle mould is available, the method begins again by way of example with step S801. It is ensured here that a potential cycle stop can be avoided since the manually assembled casting mould is not, or at least not yet, supplied to the filling area. In addition, by way of example, analogously to FIG. 6 (steps S605 and S607) another check is made, if step S807 gives YES, as to whether a cycle mould is available and, if so, whether it is part of a package series in order then nevertheless to transport the cycle mould into the filling area to conclude the package series (steps S808, S809 and S812), rather than the manually assembled casting mould.

Otherwise, especially since it is possible to ensure by means of step S807 that a potential cycle stop can be avoided until time tE or until the end of the shift even if the filling station that has become free or becomes free were occupied by the manually assembled filling station, if step S807 gives YES (or optionally when step S808 gives NO or step S809 gives NO), step S810 determines that the next filling station that becomes free or the filling station that has become free should be occupied by the manually assembled casting mould.

It is thus possible for manually assembled casting moulds to be supplied efficiently and in an automated manner to the automated circulation cycle without causing a holdup or a cycle stop therein owing to a risk of buffer zone overoccupation.

The above-described working examples should not be regarded as being self-limiting, since it is possible to combine features of the above-described working examples of the present invention or to modify working examples with features of other working examples in order to obtain further working examples of the present invention. If modifications or combinations of features of this kind are covered by the scope of the claims, they should be regarded as part of the invention, and, if they are apparent to the person skilled in the art, modifications or combinations of features of this kind should still implicitly be regarded as part of the disclosure of this description.

In the above-described working examples, the mould conveying unit 200 may be executed, for example, as a chain conveyor, but the present invention is not limited to chain conveyors. The transport units 320, 410, 510 and 610 may take the form, for example, of a robot crane.

The concrete products that have been produced by means of a system of the present invention may be produced in a wide variety of different executions and forms (if appropriate, according to the optional manufacturing stations and casting moulds provided, even without additional assembly times in a single circulation system). This includes concrete tubes of all forms, profiles and sizes, and tubes with and without reinforcements or inner tubes, for example made of plastic.

In summary, the present invention enables provision of a system and a method in which concrete products can be produced at lower cost and with high quality and reliability in automated manner and efficiently by a casting method, and especially provision of a system and a method in which concrete products of different dimensions can be manufactured by a casting method in an automated and efficient manner with short cycle times, with no requirement for assembly times and in particular with short holdup times, with firstly automated assembly of the casting moulds and secondly also manually assembled casting moulds which can be introduced into the automatic circulation cycle in an optimized and automated manner.

The invention claimed is:

1. A system for producing concrete products by casting moulds having outer and inner moulds, the system comprising an automated, program-controlled, circulation system comprising:

a hardening area configured to store concrete products hardening in a respective casting mould;

an automated manufacturing area comprising a plurality of automated manufacturing devices;

a manual assembly area arranged in parallel to the automated manufacturing area and including a manually operable mould assembly unit;

a conveying unit comprising automated circulation conveyor sections configured to convey the casting moulds or the outer and inner moulds of the casting moulds from the hardening area to the automated manufacturing area, between respective manufacturing units in the automated manufacturing area, and from the automated manufacturing area into the hardening area;

wherein the automated manufacturing area of the circulation system comprises:

an automated cleaning unit configured to automatically clean the outer and inner moulds of a casting mould positioned at the automated cleaning unit, after being demoulded in a demoulding unit;

an automated mould assembly unit configured to set up one or more casting moulds from corresponding outer and inner moulds that have been cleaned in the automated cleaning unit, and an automated filling unit configured to fill one or more set up casting moulds with concrete; and a transfer unit that is program-controlled and configured to automatically transfer one or more casting moulds supplied by a second supply conveying section from the manually operable mould assembly unit and one or more casting moulds supplied by a first supply conveying section that is separate from the second supply conveying section, from the automated mould assembly unit to one or more filling stations of the automated filling unit, wherein the manually operable mould assembly unit comprises at least one mould assembly station configured to facilitate manually assisted set up of one or more casting moulds from corresponding outer and inner moulds, wherein the conveying unit comprises:

the first supply conveying section configured to supply a casting mould of the automated mould assembly unit to the automated filling unit, the first supply conveying section being configured as a first buffer area to intermediately store a casting mould of the automated assembly area between the automated assembly area and the automated filling unit; and the second supply conveying section configured to supply a casting mould set up in the manually operable mould assembly unit to the automated circulation system, and wherein the second supply conveying section is configured as a second buffer area to intermediately store a casting mould of the manual assembly area between the manual assembly area and the automated filling unit; and a controller programmed to control the manufacturing units of the automated manufacturing area of the circulation system and the conveying unit, wherein the controller is configured to detect whether a potential buffer zone occupation number, which corresponds to a number of casting moulds from an automated circulation cycle that are being stored intermediately in the first buffer area, exceeds a maximum buffer zone occupation number for a relevant time period, wherein, if it is detected that the potential buffer zone occupation number does exceed the maximum buffer zone occupation number and a cycle mould is available it is determined that a next filling station that becomes free will be occupied by the cycle mould and it is ensured that a cycle stop can be avoided since a manually assembled casting mould is not, or not yet, supplied to the filling area.

2. The system according to claim 1, wherein the second supply conveying section is configured to supply a casting mould set up in the manually operable mould assembly unit to the automated circulation system upstream of the filling unit of the manufacturing area of the circulation system; or the second supply conveying section is configured to supply a casting mould set up in the manually operable mould assembly unit to a further filling unit and to supply it from the further filling unit to the hardening area of the automated circulation system.

3. The system according to claim 1, wherein a further conveying section is configured to supply a casting mould from the hardening area of the automated circulation system to the manual assembly area.

4. The system according to claim 1, wherein the second supply conveying section is set up to supply a casting mould set up in the manually operable mould assembly unit to the automated circulation system in an automated, program-controlled manner.

5. The system according to claim 1, wherein the automated manufacturing area of the circulation system comprises:

an automated demoulding area configured to demould a casting mould arriving from the hardening area and for removal of a hardened concrete product.

6. The system according to claim 1, wherein the transfer unit is configured to transfer casting moulds supplied by a feed conveying section and casting moulds supplied by the first supply conveying section to one or more filling stations of the automated filling unit in an automated, program-controlled manner.

7. The system according to claim 1, wherein the transfer unit comprises a deflector system configured to facilitate controllable combination of the second supply conveying section arriving from the manually operable mould assembly unit and the first supply conveying section arriving from the automated mould assembly unit upstream of the automated filling unit.

8. The system according to claim 1, wherein the transfer unit comprises a transport unit configured to accommodate a supplied casting mould from the second supply conveying section arriving from the manually operable mould assembly unit and also to accommodate a supplied casting mould from the first supply conveying section arriving from the automated mould assembly unit, and to transfer an accommodated casting mould to the automated filling unit or to one or more of the first supply conveying sections that supply the automated filling unit.

9. The system according to claim 8, wherein the transport unit comprises a manipulator and a program-controlled robot crane.

10. The system according to claim 1, wherein the transfer unit comprises a movable slide table configured to accommodate a supplied casting mould from the second supply conveying section arriving from the manually operable mould assembly unit and also a supplied casting mould from the first supply conveying section arriving from the automated mould assembly unit, and to transfer an accommodated casting mould to the automated filling unit or to one or more of the first supply conveying sections that supplies the automated filling unit.

11. The system according to claim 1, wherein the transfer unit is configured to remove a casting mould filled in the automated filling unit and to supply it to a release unit for releasing the filled casting mould into the hardening area.

12. The system according to claim 11, wherein the release unit comprises an intermediate storage area for intermediate storage of filled casting moulds before release into the hardening area.

13. The system according to claim 11, wherein the release unit comprises a manipulator or a robot crane, configured to transfer one casting mould and/or a group of two or more casting moulds into the hardening area or to a conveying section of the conveying unit that leads to the hardening area.

14. The system according to claim 11, wherein the release unit comprises a program-controlled, automated fitting device configured to fit a muff on a filled casting mould.

15. The system according to claim 1, wherein the filling unit comprises a multitude of automated filling stations configured to conduct parallel filling of multiple casting moulds with concrete in the filling unit.

16. The system according to claim 1, further comprising a control unit for programmed control of the manufacturing units of the automated manufacturing area of the circulation system and the conveying unit.

17. The system according to claim 16, wherein the control unit is configured to store an appropriate filling time for each concrete product or for each assembled casting mould, and to control the supply of casting moulds to multitude of automated filling stations for parallel filling of multiple casting moulds with concrete at the filling unit depending on corresponding filling times stored for the casting moulds.

18. The system according to claim 16, wherein the control unit is configured to store an appropriate concrete formulation for each concrete product or for each assembled casting mould, and to control the filling of a casting mould at an automated filling station depending on a corresponding concrete formulation stored.

19. The system according to claim 1, wherein the first supply conveying section supplies from the automated mould assembly unit is configured to accommodate two or more of the casting moulds arriving from the automated mould assembly unit in order to intermediately store accommodated casting moulds prior to supply to the automated filling unit in such a way that the first supply conveying section that supplies from the automated mould assembly unit has the first buffer area.

20. The system according to claim 1, wherein the second supply conveying section that supplies from the manually operable mould assembly unit is configured to accommodate two or more casting moulds arriving from the manually operable mould assembly unit in order to intermediately store accommodated casting moulds prior to introduction into the circulation system or prior to supply to the automated filling unit, in such a way that the second supply conveying section that supplies from the manually operable mould assembly unit has the second buffer area.

21. The system according to claim 1, further comprising a control unit of the system or a control unit of the automated transfer unit is configured to control the transfer unit and, for the control of the transfer unit, is configured to decide under program control whether a next free filling station of the filling unit should be occupied by a casting mould arriving from the manually operable mould assembly unit or by a casting mould arriving from the automated mould assembly unit.

22. The system according to claim 20, wherein a decision as to whether a next free filling station of the filling unit should be occupied by a casting mould arriving from the manually operable mould assembly unit or by a casting mould arriving from the automated mould assembly unit is made on a basis of one or more criteria.

23. The system according to claim 22, wherein the criteria comprises:

a criterion of whether a next casting mould arriving from the automated mould assembly unit is a last casting mould of a package series to be filled in succession, a criterion of whether a calculated time until a next-but-one filling station of the filling unit becomes free exceeds a predetermined buffer time, a criterion of whether a calculated introduction frequency of manually assembled casting moulds introduced into the automated circulation cycle exceeds a limit, a criterion of whether an instantaneous buffer zone occupation of a buffer area of the automated circulation exceeds a limit, and/or a criterion of whether a calculated function of the buffer zone occupation of a buffer area of the automated circulation cycle as a function of time over of a predetermined period of time exceeds a limit.

24. The system according to claim 1, further comprising an automated demoulding unit comprising a grab configured to remove a muff from a casting mould and/or a grab configured to removing a hardened concrete product from the casting mould.

25. A method of producing concrete products by casting moulds assembled from corresponding outer and inner moulds in a system according to claim 1, wherein the method comprises:

automated assembly of a casting mould from corresponding outer and inner moulds cleaned;

automated filling of one or more assembled casting moulds with concrete; and program-controlled supplying of a casting mould assembled in the manually operable mould assembly unit to the automated circulation system by the automated second supply conveying section, the program controlled supplying comprising:

detecting whether the potential buffer zone occupation number corresponding to the number of casting moulds from the automated circulation cycle that are stored intermediately in the first buffer area, exceeds the maximum buffer zone occupation number for the relevant time period;

for a detection that the potential buffer zone occupation number exceeds the maximum buffer zone occupation number and the cycle mould is available, determining that a next free filling station is to be occupied by the cycle mould, and preventing the cycle stop while a manually assembled casting mould is not supplied to a filling area.

26. A non-transitory computer-readable data storage medium, storing instructions executable in a data processing unit in such a way that the data processing unit executes program control of a system according to claim 1, the instructions comprising:

automated assembly of a casting mould from corresponding outer and inner moulds cleaned;

automated filling of one or more assembled casting moulds with concrete; and program-controlled supplying of a casting mould assembled in the manually operable mould assembly unit to the automated circulation system by the automated second supply conveying section, the program controlled supplying comprising:

detecting whether the potential buffer zone occupation number corresponding to the number of casting moulds from the automated circulation cycle that are stored intermediately in the first buffer area, exceeds the maximum buffer zone occupation number for the relevant time period; and for a detection that the potential buffer zone occupation number exceeds the maximum buffer zone occupation number and the cycle mould is available, determining that a next free filling station is to be occupied by the cycle mould, and preventing the cycle stop while a manually assembled casting mould is not supplied to a filling area.

* * * * *